US012686132B2

(12) United States Patent
Huang et al.

(10) Patent No.: US 12,686,132 B2
(45) Date of Patent: Jul. 21, 2026

(54) PICK AND PLACE DEVICE, PICK AND PLACE METHOD AND BATTERY PRODUCTION LINE

(71) Applicant: CONTEMPORARY AMPEREX TECHNOLOGY (HONG KONG) LIMITED, Hong Kong (CN)

(72) Inventors: Hua Huang, Ningde (CN); Yuming Xie, Ningde (CN); Xueqing Gong, Ningde (CN); Fanke Chen, Ningde (CN); Wanjin Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 67 days.

(21) Appl. No.: 18/892,017

(22) Filed: Sep. 20, 2024

(65) Prior Publication Data

US 2025/0121505 A1 Apr. 17, 2025

Related U.S. Application Data

(63) Continuation of application No. PCT/CN2023/139482, filed on Dec. 18, 2023.

(30) Foreign Application Priority Data

Oct. 12, 2023 (CN) .......................... 202311320839.9

(51) Int. Cl.
B25J 9/16 (2006.01)
B25J 9/02 (2006.01)
(Continued)

(52) U.S. Cl.
CPC ............. B25J 9/1687 (2013.01); B25J 9/023 (2013.01); B25J 13/088 (2013.01); H01M 50/244 (2021.01)

(58) Field of Classification Search
CPC ........ B65G 61/00; B65G 47/90; B65G 57/24; B65G 59/02; B65G 1/0464;
(Continued)

(56) References Cited

U.S. PATENT DOCUMENTS 5,127,695 A * 7/1992 Zoeten ...................... B66C 1/24
294/67.33
5,950,802 A * 9/1999 Kubota ................ H05K 13/021
294/87.1

(Continued)

FOREIGN PATENT DOCUMENTS

CN 103419207 A 12/2013
CN 103434839 A 12/2013
(Continued)

OTHER PUBLICATIONS

The World Intellectual Property Organization (WIPO) International Search Report and Written Opinion for PCT/CN2023/139482 Jul. 7, 2024 20 Pages (including Translation).
(Continued)

*Primary Examiner* — Gregory W Adams
(74) *Attorney, Agent, or Firm* — ANOVA LAW GROUP, PLLC

(57) ABSTRACT

A pick and place device comprises at least one pair of pick and place assemblies and at least two detectors. Each pick and place assembly comprises: a first guide rail extending in a first direction, a second guide rail extending in a second direction intersecting the first direction, a clamping assembly comprising first and second clamping members, and a connecting member connected to the first guide rail and the second guide rail. The first and second clamping members are arranged on the first and second guide rails, respectively, and are movable closer to or away from each other. The connecting member is configured to be movable along the first guide rail and the second guide rail. Each detector is (Continued)

arranged on the respective connecting member and is configured to detect whether there is an obstacle within a specified range in a preset direction.

20 Claims, 7 Drawing Sheets

(51) Int. Cl.
    *B25J 13/08*          (2006.01)
    *H01M 50/244*       (2021.01)
(58) Field of Classification Search
    CPC ....... B65G 2814/031; B65G 2201/0258; B25J
                15/0253; B25J 15/10; B25J 15/0028;
                B25J 15/0052; B25J 11/0095; B25J
            13/086; B25J 13/088; B25J 19/021; B25J
                15/00; B25B 5/142; B25B 5/145; B25B
                5/02; B25B 5/068; B25B 5/102; B25B
                    5/14; B25B 5/163; B25B 5/166
    See application file for complete search history.

(56)                  References Cited

U.S. PATENT DOCUMENTS

| | | | | |
|---|---|---|---|---|
| 6,327,929 | B1 * | 12/2001 | Yanagisawa | B23Q 5/40 |
| | | | | 248/661 |
| 6,464,069 | B1 * | 10/2002 | Rich | H05K 13/041 |
| | | | | 294/87.1 |
| 6,520,900 | B1 * | 2/2003 | Sandford | B26D 7/1818 |
| | | | | 493/143 |
| 6,997,364 | B2 * | 2/2006 | Oetlinger | B26D 7/1818 |
| | | | | 225/104 |
| 7,226,270 | B2 * | 6/2007 | Hwang | B65G 47/90 |
| | | | | 901/16 |
| 9,038,999 | B2 * | 5/2015 | Kiridena | B21D 31/005 |
| | | | | 52/666 |
| 10,053,301 | B2 * | 8/2018 | Kyotani | B65G 47/90 |

| | | | | |
|---|---|---|---|---|
| 10,233,039 | B2 * | 3/2019 | Miyoshi | B65G 1/14 |
| 10,654,176 | B2 * | 5/2020 | Jonas | B25J 15/0253 |
| 2015/0336280 | A1 | 11/2015 | Usami | |
| 2016/0001992 | A1 * | 1/2016 | Takao | B65G 61/00 |
| | | | | 414/788.4 |
| 2019/0092584 | A1 * | 3/2019 | Henderson | B65G 61/00 |
| 2019/0358827 | A1 | 11/2019 | Guo et al. | |
| 2021/0309467 | A1 * | 10/2021 | Gensch | B65G 57/06 |

FOREIGN PATENT DOCUMENTS

| | | | | |
|---|---|---|---|---|
| CN | 104290099 | A | 1/2015 | |
| CN | 106142063 | A | 11/2016 | |
| CN | 107298307 | A | 10/2017 | |
| CN | 110606365 | A | 12/2019 | |
| CN | 211109814 | U | 7/2020 | |
| CN | 111606033 | A | 9/2020 | |
| CN | 214933875 | U | 11/2021 | |
| CN | 111606033 | B * | 12/2021 | B65G 35/00 |
| CN | 113979106 | A | 1/2022 | |
| CN | 217101822 | U | 8/2022 | |
| CN | 217317999 | U | 8/2022 | |
| CN | 217946833 | U | 12/2022 | |
| CN | 218641162 | U | 3/2023 | |
| CN | 219193730 | U | 6/2023 | |
| CN | 117049159 | A | 11/2023 | |
| KR | 20190092019 | A | 8/2019 | |

OTHER PUBLICATIONS

China National Intellectual Property Administration (CNIPA) Office Action 1 for Application No. 202311320839.9 Nov. 21, 2023 22 Pages (including translation).

State Intellectual Property Office of China Notice of Grant of Invention Patent Right for Application No. 202311320839.9 Dec. 6, 2023 8 pages (including translation).

The European Patent Office (EPO) The Partial Supplementary European Search Report for Application No. 23892788.3 Feb. 2, 2026 12 Pages.

* cited by examiner 34 1 4 36 35

6 2

6

33 33 30

6

Y

X

PICK AND PLACE DEVICE, PICK AND PLACE METHOD AND BATTERY PRODUCTION LINE

CROSS-REFERENCE TO RELATED APPLICATIONS

This application is a continuation of International Application No. PCT/CN2023/139482, filed on Dec. 18, 2023, which is filed based on and claims priority to Chinese Patent Application No. 202311320839.9, entitled "PICK AND PLACE DEVICE, PICK AND PLACE METHOD AND BATTERY PRODUCTION LINE" and filed on Oct. 12, 2023, the entire contents of both of which are incorporated herein by reference.

TECHNICAL FIELD

The present disclosure relates to the technical field of battery manufacturing, and in particular to a pick and place device, a pick and place method and a battery production line.

BACKGROUND ART

New energy batteries are increasingly used in life and industry. For example, new energy vehicles equipped with batteries have been widely used. In addition, batteries are increasingly used in the field of energy storage, etc.

In battery production and manufacturing process, especially in a process of placing a battery into a case, it is generally needed to detect the position of the battery before placing it into the case, so as to prevent the battery from colliding with a case wall or a cross beam inside the case in the process of placing the battery into the case, which otherwise causes damage to the battery or even causes fire and other accidents. There are many types of batteries with various sizes and specifications. In order to pick and place and detect batteries of different sizes and specifications, different specifications of pick and place devices are required. In addition, the requirements for the flexibility of battery production lines are getting higher and higher in the industry. Therefore, how to adapt and be compatible with batteries of various sizes and specifications in the battery production line is one of the research topics in the industry.

SUMMARY

In order to solve the above technical problem, an objective of the present disclosure is to provide a pick and place device, a pick and place method and a battery production line, which are compatible with batteries of various sizes and specifications and have a simple structure.

The present disclosure is implemented by the following technical solutions.

A first aspect of the present disclosure provides a pick and place device for picking up and placing a workpiece. The pick and place device comprises at least one pair of pick and place assemblies and at least two detectors. Each pick and place assembly comprises: a first guide rail extending in a first direction; a second guide rail extending in a second direction intersecting the first direction; a clamping assembly, comprising a first clamping member and a second clamping member, wherein the first clamping member is arranged on the first guide rail, the second clamping member is arranged on the second guide rail, and the first clamping member and the second clamping member are movable closer to or away from each other; and a connecting member connected to the first guide rail and the second guide rail, and configured to be movable along the first guide rail and the second guide rail respectively; wherein each detector is arranged on the respective connecting member and is configured to detect whether there is an obstacle within a specified range in a preset direction.

Since the pick and place device comprises at least one pair of pick and place assemblies, and each pick and place assembly comprises a first clamping member and a second clamping member that can move closer to or away from each other, it is possible to pick up the workpiece by moving the first clamping member and the second clamping member closer to each other, and to place the workpiece by moving the first clamping member and the second clamping member away from each other, so that the workpiece can be picked up and placed by means of a simple structure and simple actions, improving the pick and place efficiency and reducing the production cost. Moreover, since the pick and place device further comprises detectors, after picking up the workpiece, each detector can be used to detect whether there is an obstacle within a specified range in a preset direction, so as to prevent the occurrence of undesirable situations such as damage to or placement failure of the workpiece due to touching an obstacle during placement, improving the reliability of the pick and place device.

In addition, since the pick and place assembly comprises a connecting member connected to the first guide rail and the second guide rail, and the connecting member can move along the first guide rail and the second guide rail respectively, the first guide rail can move in the second direction by means of the connecting member, and the second guide rail can also move in the first direction by means of the connecting member. In this way, the first clamping member arranged on the first guide rail and the second clamping member arranged on the second guide rail can be moved closer to or away from each other in a simple manner, thereby realizing the picking-up or placement of the workpiece, and workpieces of different sizes and specifications can also be adapted by adjusting the movement strokes of the first clamping member and the second clamping member in the first direction and the second direction, so as to pick up and place workpieces of different sizes and specifications, thereby providing good compatibility and facilitating flexible production.

Moreover, since each detector is arranged on the connecting member, when the first clamping member and the second clamping member move closer to each other in the first direction and the second direction by means of the connecting member to pick up the workpiece, the detector can move along with the connecting member to a specified position for detection. Since the detector can move along with the movement of the connecting member, when the pick and place device picks up workpieces of different sizes and specifications, the detector can also perform corresponding detections on the workpieces of different sizes and specifications, improving the detection compatibility of the pick and place device and further facilitating flexible production.

In some embodiments, the connecting member comprises a first block and a second block connected to each other; and the first block is arranged on the first guide rail in such a way that it is movable along the first guide rail, and the second block is arranged on the second guide rail in such a way that it is movable along the second guide rail.

In this way, the connecting member can realize the respective movements of the connecting member in the first direction and the second direction in a simple manner through the movement of the first block along the first guide rail and the movement of the second block along the second guide rail, so as to drive the first clamping member and the second clamping member to move in the first direction and the second direction to pick up or place workpieces of different sizes and specifications, and drive the detector arranged on the connecting member to move in the first direction and the second direction to detect the workpieces of different sizes and specifications, so that the structure is simple, and the picking-up, placement and detection effects are good.

In some embodiments, the first block is provided with a first through hole penetrating the first block in the first direction, and the first block is sleeved on the first guide rail by means of the first through hole; and the second block is provided with a second through hole penetrating the second block in the second direction, and the second block is sleeved on the second guide rail by means of the second through hole.

In this way, the first block can move along the first guide rail through the cooperation between the first through hole and the first guide rail, and the second block can move along the second guide rail through the cooperation between the second through hole and the second guide rail, thereby realizing the movements of the connecting member along the first guide rail and the second guide rail, so that the structure is simple, and is easy to manufacture, and the production cost can be effectively reduced.

In some embodiments, the connecting member is provided with a connecting plate, and the detector is connected to the connecting plate.

In this way, each detector can be arranged on the respective connecting member by means of the connecting plate, so that a detection signal can be easily sent to a specified range in a preset direction from a position avoiding the first guide rail and the second guide rail to detect whether there is an obstacle. In addition, the mounting position of the detector can be changed by changing the position or form of the connecting plate, so that the detector can send a detection signal to the specified range in the preset direction according to actual requirements, improving the detection accuracy and the detection reliability.

In some embodiments, the connecting plate comprises a first plate body and a second plate body, the first plate body extends in the first direction, and the second plate body extends in the second direction; and one pick and place assembly is provided with two detectors, one of the detectors is arranged on the first plate body, and the other detector is arranged on the second plate body.

In this way, the two detectors can respectively send detection signals toward two different specified ranges by means of the first plate body and the second plate body, so that it is possible to detect whether there are obstacles within the two specified ranges, thereby expanding the detection range of the detection, and further improving the detection accuracy.

In some embodiments, the pick and place device comprises a first driving device and a second driving device, the first driving device is connected to the first clamping member, and the second driving device is connected to the second clamping member; and the first clamping member drives the connecting member to move along the second guide rail under the driving of the first driving device, and the second clamping member drives the connecting member to move along the first guide rail under the driving of the second driving device, so as to perform a clamping operation and cause the detector arranged on the connecting member to move to a specified position.

In this way, the driving of the clamping assembly by the driving device enables the first clamping member and the second clamping member to move closer to or away from each other in an automated manner, so that picking-up and placement of the workpiece are easily realized, the degree of automation is effectively improved, and the labor cost is reduced. In addition, the connecting member will move along with the movement of the clamping assembly, so that the detector arranged on the connecting member can also move to the specified position in an automated manner along with the movement of the connecting member, thereby easily realizing the detection.

In some embodiments, the first clamping member is arranged on the first guide rail in such a way that it is movable along the first guide rail.

In this way, the first clamping member can move in the first direction by means of the first guide rail, so that the pick and place device can adjust the position of the first clamping member in the first direction depending on the workpieces of different sizes and specifications, in order to achieve a better picking-up operation, facilitating the improvement of the picking-up stability of the pick and place device.

In some embodiments, the clamping assembly comprises a first slider and a first fixing plate; and the first slider is arranged on the first guide rail in such a way that it is movable along the first guide rail, the first fixing plate is connected to the first slider, and the first clamping member is connected to the first fixing plate.

In this way, the movement of the first clamping member in the first direction can be realized by means of a simple structure, thereby reducing the assembly difficulty and saving the production cost. In addition, due to the provision of the first fixing plate, the stability of the first clamping member when moving in the first direction and the picking-up stability when picking up the workpiece can be improved.

In some embodiments, the second clamping member is arranged on the second guide rail in such a way that it is movable along the second guide rail.

In this way, the second clamping member can move in the second direction by means of the second guide rail, so that the pick and place device can adjust the position of the second clamping member in the second direction depending on the workpieces of different sizes and specifications, in order to achieve a better picking-up operation, further facilitating the improvement of the picking-up stability of the pick and place device.

In some embodiments, the clamping assembly comprises a second slider and a second fixing plate; and the second slider is arranged on the second guide rail in such a way that it is movable along the second guide rail, the second fixing plate is connected to the second slider, and the second clamping member is connected to the second fixing plate.

In this way, the movement of the second clamping member in the second direction can be realized by means of a simple structure, thereby reducing the assembly difficulty and saving the production cost. In addition, since the second fixing plate is provided, the stability of the second clamping member when moving in the second direction and the picking-up stability when picking up the workpiece can be improved.

In some embodiments, the first clamping member and the second clamping member comprise pressure strips, which are respectively arranged on clamping surfaces of the first clamping member and the second clamping member, and in a state where the pick and place device picks up the workpiece, the clamping surfaces face the workpiece; and the pressure strips each comprise a contact surface configured for contact with the workpiece.

Since the clamping assembly comprises pressure strips, and the pressure strips comprise contact surfaces, the workpiece can be clamped and picked up through the contact between the contact surfaces of the pressure strips and the workpiece, so that the structure is simple and the picking-up effect is good.

In some embodiments, the pressure strip is made of an elastic material.

In this way, when the pick and place device clamps and picks up the workpiece, the damage to the workpiece can be avoided, thereby improving the picking-up reliability of the pick and place device.

In some embodiments, the detector comprises a range finder.

In this way, the range finder can be used to measure the distance within the specified range in the preset direction, and then based on the comparison between the measured distance and a preset distance, it is possible to detect whether there is an obstacle within the specified range in the preset direction, so as to prevent the occurrence of undesirable situations such as damage to the workpiece due to touching an obstacle during placement, improving the reliability of the pick and place device.

In some embodiments, the intersecting comprises perpendicular intersecting.

In this way, the workpiece can be picked up and placed along two perpendicular directions in a plane. This is particularly suitable for picking up and placing cuboid-shaped workpieces.

A second aspect of the present disclosure provides a pick and place method, in which a pick and place device is used to pick up and place a workpiece, the pick and place device comprises at least one pair of pick and place assemblies and at least two detectors, and the detectors are each configured to detect whether there is an obstacle within a specified range in a preset direction; the pick and place method comprising: a picking-up step of picking up the workpiece by means of the pick and place assemblies of the pick and place device, and moving the workpiece to the vicinity of a specified position; a detection step of sending a detection signal within the specified range in the preset direction by each detector to confirm that the workpiece moves to an alignment position for the specified position; and a placing step of placing the workpiece located in the alignment position to the specified position by the pick and place assemblies.

In this way, the workpiece can be easily picked up and placed by using the pick and place device, and before placing the workpiece, it is detected whether there is an obstacle within a specified range in a specified region to ensure that the workpiece can be moved to an accurate alignment position, so as to prevent the damage to or placement failure of the workpiece due to contact of the workpiece with an obstacle during placement, improving the placement accuracy.

In some embodiments, before the detection step, the pick and place method further comprises: a correction step of correcting the position of the workpiece by an image capture device.

In this way, the position of the workpiece can be substantially corrected by the image capture device first, and the positional relationship between the workpiece and the specified position can be detected to ensure that the workpiece can be within the specified range in the preset direction, to prevent the occurrence of the undesirable situation where the workpiece has failed to be placed in the specified position during placement. Moreover, performing a correction step before fine alignment facilitates the improvement of the overall pick and place efficiency.

In some embodiments, the pick and place assembly comprises a first guide rail, a second guide rail, a clamping assembly and a connecting member, and the pick and place device further comprises a first driving device and a second driving device; the clamping assembly comprises a first clamping member and a second clamping member, the first clamping member is arranged on the first guide rail, and the second clamping member is arranged on the second guide rail; the first clamping member is connected to the first driving device, the second clamping member is connected to the second driving device, the first clamping member and the second clamping member are movable closer to or away from each other, clamping surfaces of the first clamping member and the second clamping member are respectively provided with pressure strips, the pressure strips comprise contact surfaces, and in a state where the pick and place device picks up the workpiece, the clamping surfaces face the workpiece; the connecting member is connected to the first guide rail and the second guide rail; and the picking-up step comprises: the first clamping member driving the connecting member to move along the second guide rail under the driving of the first driving device until the contact surface of the pressure strip of the first clamping member comes into contact with a surface of the workpiece; and the second clamping member driving the connecting member to move along the first guide rail under the driving of the second driving device until the contact surface of the pressure strip of the second clamping member comes into contact with a surface of the workpiece.

In this way, the workpiece can be clamped and picked up in a simple and automated manner under the driving of the driving devices, thereby reducing the labor cost and improving the picking-up efficiency of the pick and place device. In addition, the movement strokes of the first clamping member and the second clamping member along the first guide rail and the second guide rail can be changed to adapt to workpieces of different sizes and specifications, providing good compatibility and facilitating flexible production.

In some embodiments, before the placing step, the pick and place method further comprises: an adjustment step of adjusting the position of the workpiece such that the workpiece is in the alignment position.

In this way, the position of the workpiece can be adjusted before placing the workpiece, so that the workpiece can be accurately located in the alignment position, to prevent the occurrence of the undesirable situation where the workpiece is not placed in the specified position during placement, improving the placement accuracy and reliability of the workpiece.

In some embodiments, the detection step comprises: each detector sending a detection signal within a specified range in a preset direction; and determining whether there is an obstacle within the specified range in the preset direction based on a reflected signal of the detection signal, wherein it is determined whether the detection signals sent by all the detectors reach the specified position, and if the detection signals all reach the specified position, it is determined that there is no obstacle within the specified range in the preset direction, to confirm that the workpiece moves to the alignment position for the specified position, and the method proceeds to the placing step; otherwise, it is determined that there is an obstacle within the specified range in the preset direction, the workpiece does not move to the alignment position for the specified position, an alarm is sent the method proceeds to the adjustment step, and the detection step is repeated after the adjustment is completed, until the workpiece is located in the alignment position for the specified position.

Since the detection result of the detector is used to determine whether there is an obstacle within the specified range in the preset direction, it can be easily determined whether the workpiece can be accurately placed in the specified position, to prevent the occurrence of undesirable situations such as damage to the workpiece due to contact with an obstacle during placement. In addition, since an alarm will be sent in the detection step when it is determined that the workpiece has failed to move to the alignment position, and the method proceeds to the adjustment step to adjust the position of the workpiece, the position of the workpiece that has not moved to the alignment position can be adjusted again. After the adjustment is completed, the detection step is repeated until the workpiece is located in the alignment position. This ensures that the workpiece can finally be accurately placed in the specified position, facilitating the improvement of the placement accuracy and reliability of the workpiece.

In some embodiments, the workpiece comprises at least one battery; and the specified position comprises a case for accommodating the at least one battery.

In this way, the pick and place method using a pick and place device can be used to pick up and place the battery, and can be used to detect whether the battery will touch an obstacle when it is placed into the case, that is, whether the battery can be accurately placed into the case. Moreover, it is also possible to be compatible with batteries of different sizes and specifications, thereby improving the compatibility of the pick and place method and the production method of the entire production line.

A third aspect of the present disclosure provides a battery production line, comprising: a pick and place device provided according to the first aspect of the present disclosure; a case having an accommodating space for accommodating a workpiece, wherein the pick and place device picks up a battery as the workpiece and places the battery into the accommodating space of the case; and a transfer device connected to the pick and place device and configured to lift and transfer the pick and place device.

In this way, the battery can be picked up, detected and placed by means of a simple structure and simple actions, facilitating accurate and safe placement of the battery in the case, and providing better stability and higher reliability. Moreover, the pick and place device can adapt to batteries of various sizes and specifications, and have better compatibility. Moreover, flexible production of the battery production line is also facilitated.

In some embodiments, the battery production line further comprises an image capture device configured to detect the positional relationship between the picked-up battery and the case.

In this way, before the pick and place device places the battery into the case, the image capture device can be used to preliminarily detect the positional relationship between the picked-up battery and the case, so as to ensure that the battery can be located within the range of an opening of the case, and to prevent the occurrence of the undesirable situation where the battery has failed to be placed into the case during placement.

Effects of the Disclosure

Through the present disclosure, a pick and place device, a pick and place method, and a battery production line are provided, which have a simple structure and are compatible with workpieces of different sizes and specifications.

BRIEF DESCRIPTION OF THE DRAWINGS

Various other advantages and benefits will become obvious to those of ordinary skill in the art upon reading the following detailed description of some implementations. Accompanying drawings are merely for the purpose of illustrating some implementations and are not to be construed as limiting the present disclosure. Moreover, like components are denoted by like reference signs throughout the accompanying drawings. In the drawings.

LIST OF REFERENCE SIGNS

Figure 1:
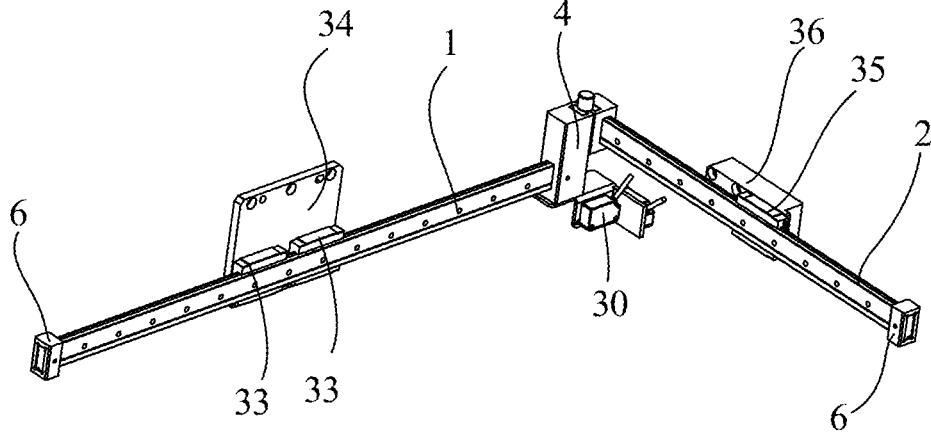
FIG. 1 is a partial schematic perspective structural diagram of a pick and place assembly according to some embodiments of the present disclosure.
Figure 1:
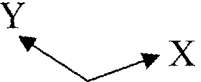

1—first guide rail; 2—second guide rail; 3—clamping assembly; 31—first clamping member; 32—second clamping member; 33—first slider; 34—first fixing plate; 35—second slider; 36—second fixing plate; 4—connecting member; 41—first block; 411—first sliding groove; 412—first through hole; 42—second block; 421—second sliding groove; 422—second through hole; 43—connecting block; 5—connecting plate; 51—first plate body; 52—second plate body; 6—stopping member; 7—pressure strip; 10—workpiece; 20—pick and place assembly; 30—detector; 40—case; 100—pick and place device.

DETAILED DESCRIPTION OF EMBODIMENTS

The embodiments of the technical solutions of the present disclosure will be described in detail below with reference to the accompanying drawings. The following embodiments are merely intended to more clearly illustrate the technical solutions of the present disclosure, so they merely serve as examples, but are not intended to limit the scope of protection of the present disclosure.

Unless otherwise defined, all technical and scientific terms used herein have the same meanings as those commonly understood by those skilled in the art to which the present disclosure belongs. The terms used herein are merely for the purpose of describing specific embodiments, but are not intended to limit the present disclosure. The terms "comprising" and "having" and any variations thereof in the present disclosure are intended to cover non-exclusive inclusion.

In the description of the embodiments of the present disclosure, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present disclosure, "a plurality of" means two or more, unless otherwise specifically defined.

The phrase "embodiment" mentioned herein means that the specific features, structures, or characteristics described with reference to the embodiments can be encompassed in at least one embodiment of the present disclosure. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present disclosure, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects.

In the description of the embodiments of the present disclosure, the orientation or position relationship indicated by the technical terms "length", "width", "thickness", "upper", "lower", "front", "rear", "left", "right", "vertical", "horizontal", "top", "bottom", "inner", "outer", "circumferential", etc. are based on the orientation or position relationship shown in the accompanying drawings and are merely intended to facilitate and simplify the description of the embodiments of the present disclosure, rather than indicating or implying that the device or element considered must have a particular orientation or be constructed, operated or used in a particular orientation, and therefore not to be construed as limiting the embodiments of the present disclosure.

In the description of the embodiments of the present disclosure, unless otherwise explicitly specified and defined, the technical terms such as "mounting", "connecting", "connection", and "fixing" should be construed in a broad sense, for example, may be a fixed connection, a detachable connection, or integration; or may be a mechanical connection or an electric connection; and may be a direct connection or an indirect connection by means of an intermediate medium, or may be communication between interiors of two elements or interaction between the two elements. For those of ordinary skills in the art, the specific meanings of the above terms in the embodiments of the present disclosure may be construed according to specific circumstances.

In the description of the embodiments of the present disclosure, the technical term "contact" shall be understood in a broad sense, unless otherwise expressly specified and defined, which may be direct contact or contact through an intermediate media layer, and may be contact with basically no interaction force between the two in contact, or contact with an interaction force between the two in contact.

The present disclosure will be described below in detail.

At present, new energy batteries are increasingly used in daily life and industry. New energy batteries are not only used in energy storage power systems such as hydraulic power, thermal power, wind power and solar power stations, but also widely used in electric vehicles such as electric bicycles, electric motorcycles, electric vehicles, aerospace and other fields. With the continuous expansion of the application field of traction batteries, the market demand for the traction batteries is also expanding.

In the battery production and manufacturing process, it is needed to package a battery. For example, a plurality of batteries may be integrated into a battery module or a battery unit, and then the battery module or battery unit is placed into a case to form a battery pack (MTP, Module To Pack), or a plurality of batteries may be directly placed into a case to form a battery pack (CTP, Cell To Pack). During the process of placing the battery into the case, it is generally needed to use a pick and place device to pick up the battery first, and then move the battery to a specified alignment position before placing the battery into the case. It is needed to detect the position of the battery before the battery is placed into the case, so as to prevent the battery from colliding with a case wall or a cross beam inside the case in the process of placing the battery into the case, which otherwise causes damage to the battery or even causes fire and other accidents, or to prevent the undesirable situation where the battery fails to be placed into the case due to that the battery is not in an accurate alignment position.

In the related art, in order to accurately place the battery into the case, it is generally needed to use an industrial camera to capture images of identification points in the case to calculate the amount of correction required for each battery, thereby guiding the battery to be accurately placed into the case. In the actual production process, if there are abnormal situations such as mechanical looseness, camera looseness or program failure, the placement accuracy of the battery will be insufficient, which may cause the battery to fail to be accurately located in the alignment position.

In addition, in order to adapt to different product needs, battery manufacturers generally need to manufacture battery products of various specifications, so batteries have many various sizes and specifications. However, the existing pick and place device has a relatively simple form and can only pick up and place batteries of a single size and specification. Moreover, the industrial camera used to detect and correct the position of the battery has a fixed position, and thus can only perform detection at the fixed position, so that the versatility is poor. If it is needed to pick up and place batteries of different sizes and specifications and to detect obstacles in different positions, then it is needed to replace accessories, prepare various types of pick and place devices, and change the camera position to meet the usage requirements. When changing the position of the camera and replacing accessories for the pick and place device, it is needed to pause the picking-up, placement and detection operations, and to change the position of the camera and replace the accessories manually or by means of a manipulator. This increases the number of operating steps, reduces the pick and place efficiency, and is detrimental to control of the production cost. Moreover, preparing various types of pick and place devices increases the manufacturing cost of the pick and place devices, and the production line also requires a large amount of buffer space to store various types of pick and place devices, which is detrimental to the improvement of space utilization.

In view of the problems existing in the above related art, the present disclosure proposes a pick and place device, which is configured to pick up a workpiece and place the workpiece to a specified position. The pick and place device comprises at least one pair of pick and place assemblies and at least two detectors. Each pick and place assembly comprises a first guide rail, a second guide rail, a clamping assembly and a connecting member. The first guide rail extends in a first direction, and the second guide rail extends in a second direction intersecting the first direction. The clamping assembly comprises a first clamping member and a second clamping member. The first clamping member is arranged on the first guide rail, the second clamping member is arranged on the second guide rail, and the first clamping member and the second clamping member can move closer to or away from each other. The connecting member is connected to the first guide rail and the second guide rail, and is configured to be movable along the first guide rail and the second guide rail respectively. Each detector is arranged on the respective connecting member, and is configured to detect whether there is an obstacle within a specified range in a preset direction.

The pick and place device of the embodiment of the present disclosure can pick up and place the workpiece via the clamping assembly by means of a simple structure and simple actions, so that the pick and place efficiency can be effectively improved, and the production cost can be reduced. Moreover, since the pick and place device further comprises detectors, after picking up the workpiece, each detector can be used to detect whether there is an obstacle within a specified range in a preset direction, so as to prevent undesirable situations such as damage to or placement failure of the workpiece due to touching an obstacle during placement, improving the reliability of the pick and place device.

In addition, the pick and place device can also adapt to workpieces of different sizes and specifications by adjusting the movement strokes of the first clamping member and the second clamping member in the first direction and the second direction, so as to realize the picking-up of workpieces of different sizes and specifications, providing good compatibility and facilitating flexible production. Moreover, since the detector is arranged on the connecting member, and the detector can move along with the movement of the connecting member, when the pick and place device picks up workpieces of different sizes and specifications, there is no need to manually change the position of the detector, and the detector can also perform corresponding detections on the workpieces of different sizes and specifications, saving the labor cost, improving the detection compatibility of the pick and place device and further facilitating flexible production.

The pick and place device of the embodiment of the present disclosure can be used in the battery production process, for example, for picking up, placement, detection, etc. of the battery when placing it into a case. Of course, those skilled in the art should understand that the pick and place device provided in the embodiment of the present disclosure is not only used to pick up, place and detect various workpieces in the battery production and manufacturing process, but can also be used to perform corresponding operations on any other workpieces that need to be picked up, placed, and detected.

Some embodiments of the present disclosure are described below in detail with reference to FIGS. 1 to 7.

Figure 2:
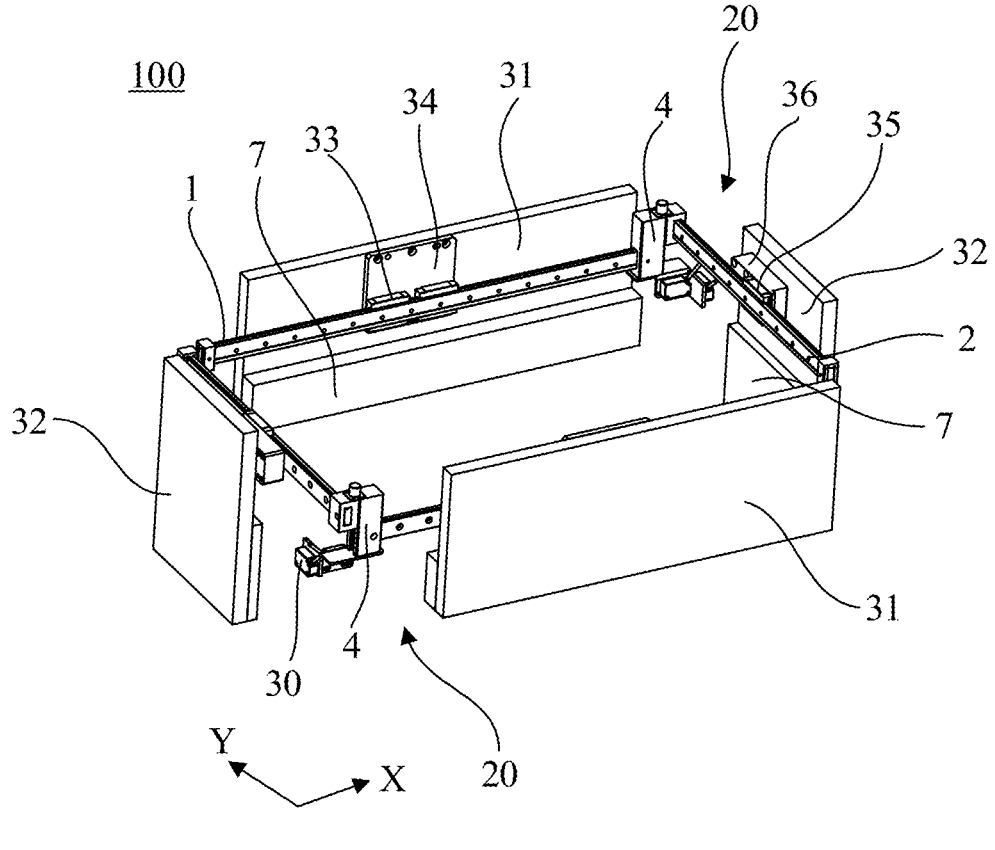
FIG. 2 is a schematic perspective structural diagram of a pick and place device according to some embodiments of the present disclosure.
Figure 3:
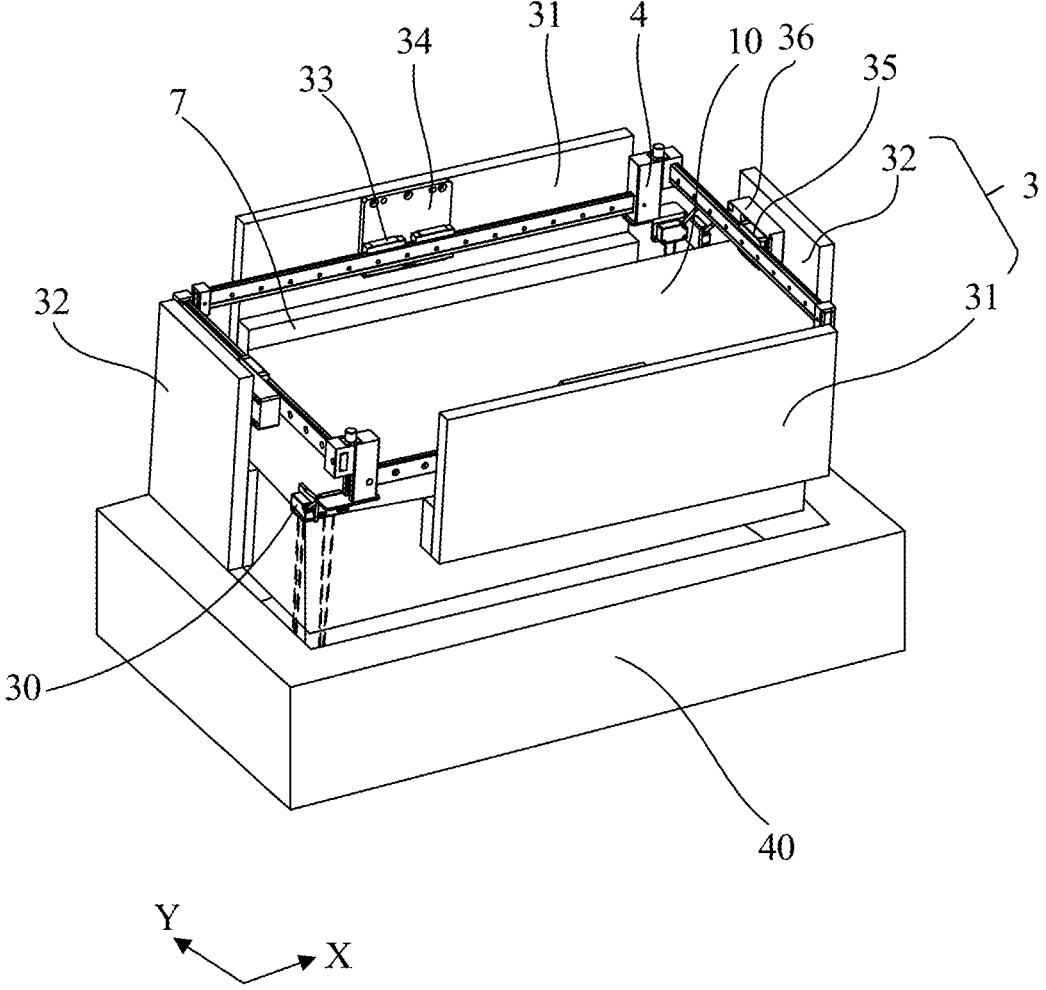
FIG. 3 is a schematic perspective structural diagram of a pick and place device according to some embodiments of the present disclosure when picking up and placing a workpiece.
Figure 4:
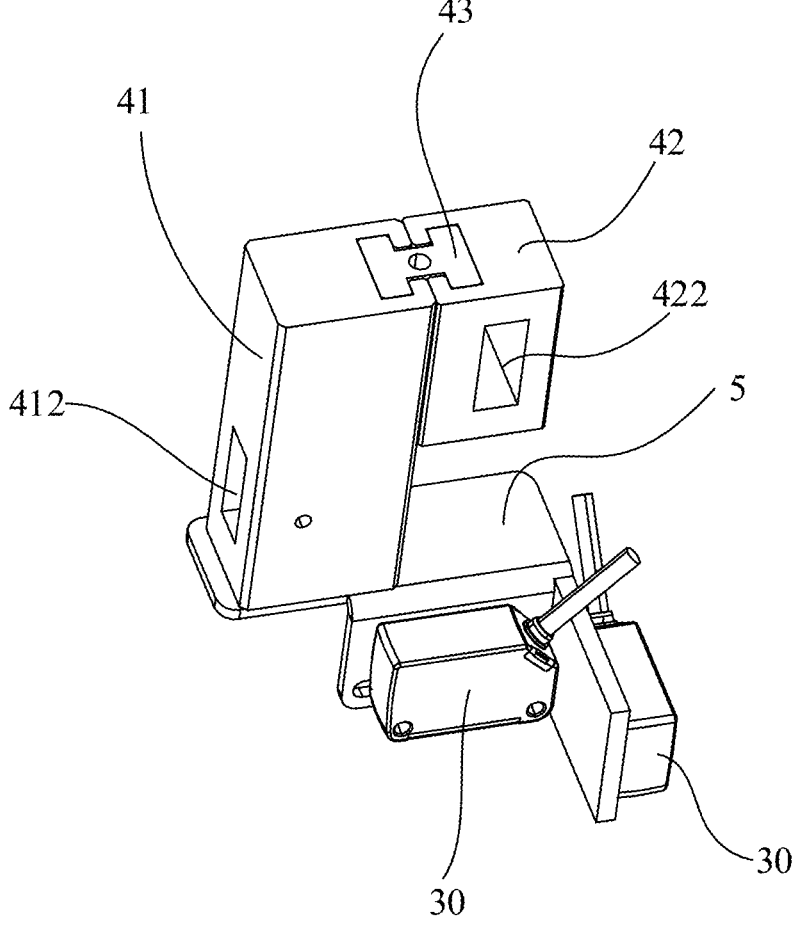
FIG. 4 is a schematic perspective structural diagram of a connecting member, a connecting plate and detectors according to some embodiments of the present disclosure in an assembled state.
Figure 5:
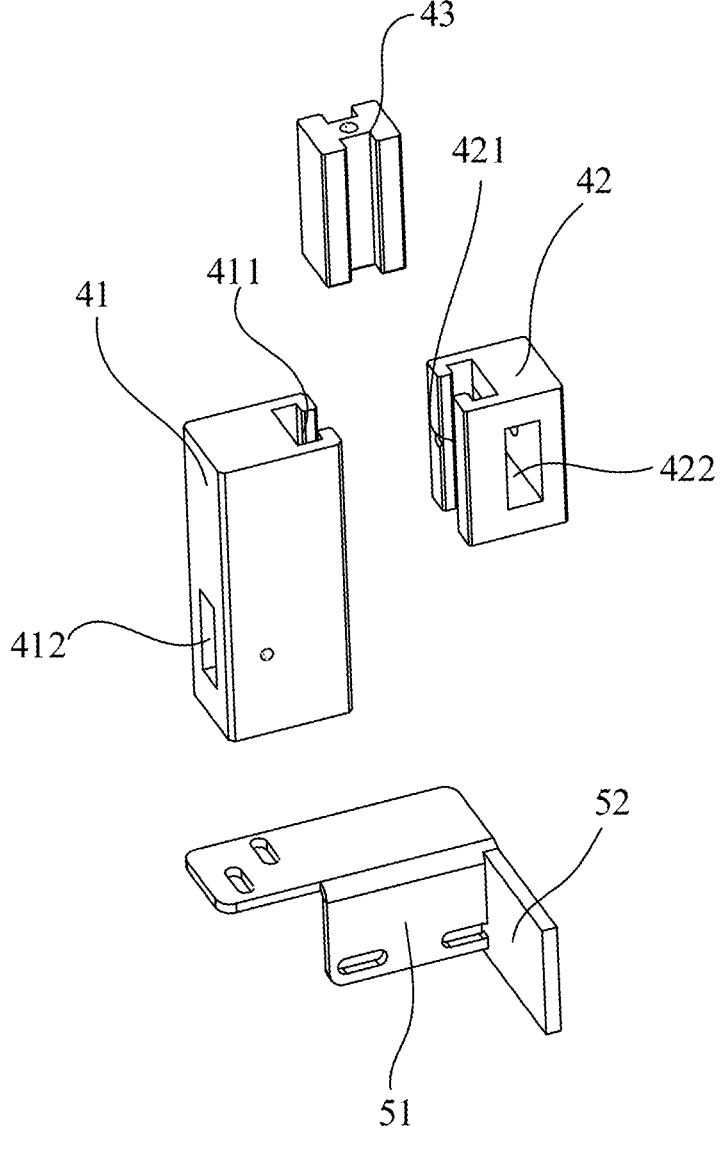
FIG. 5 is a schematic perspective exploded structural diagram of a connecting member and a connecting plate according to some embodiments of the present disclosure.
Figure 6:
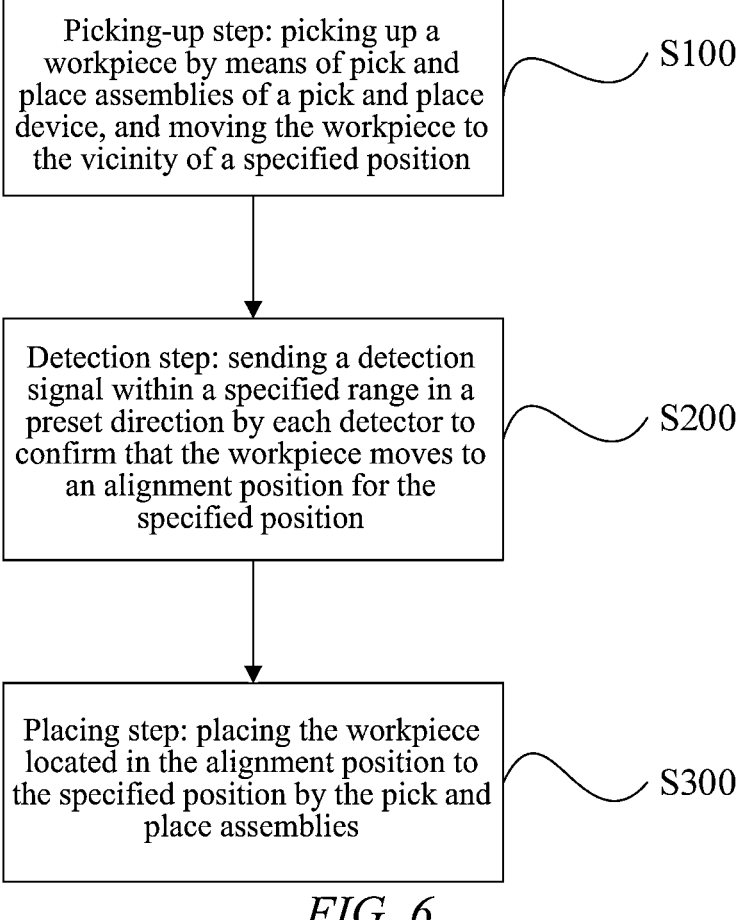
FIG. 6 is a schematic flowchart of a pick and place method according to some embodiments of the present disclosure.
Figure 7:
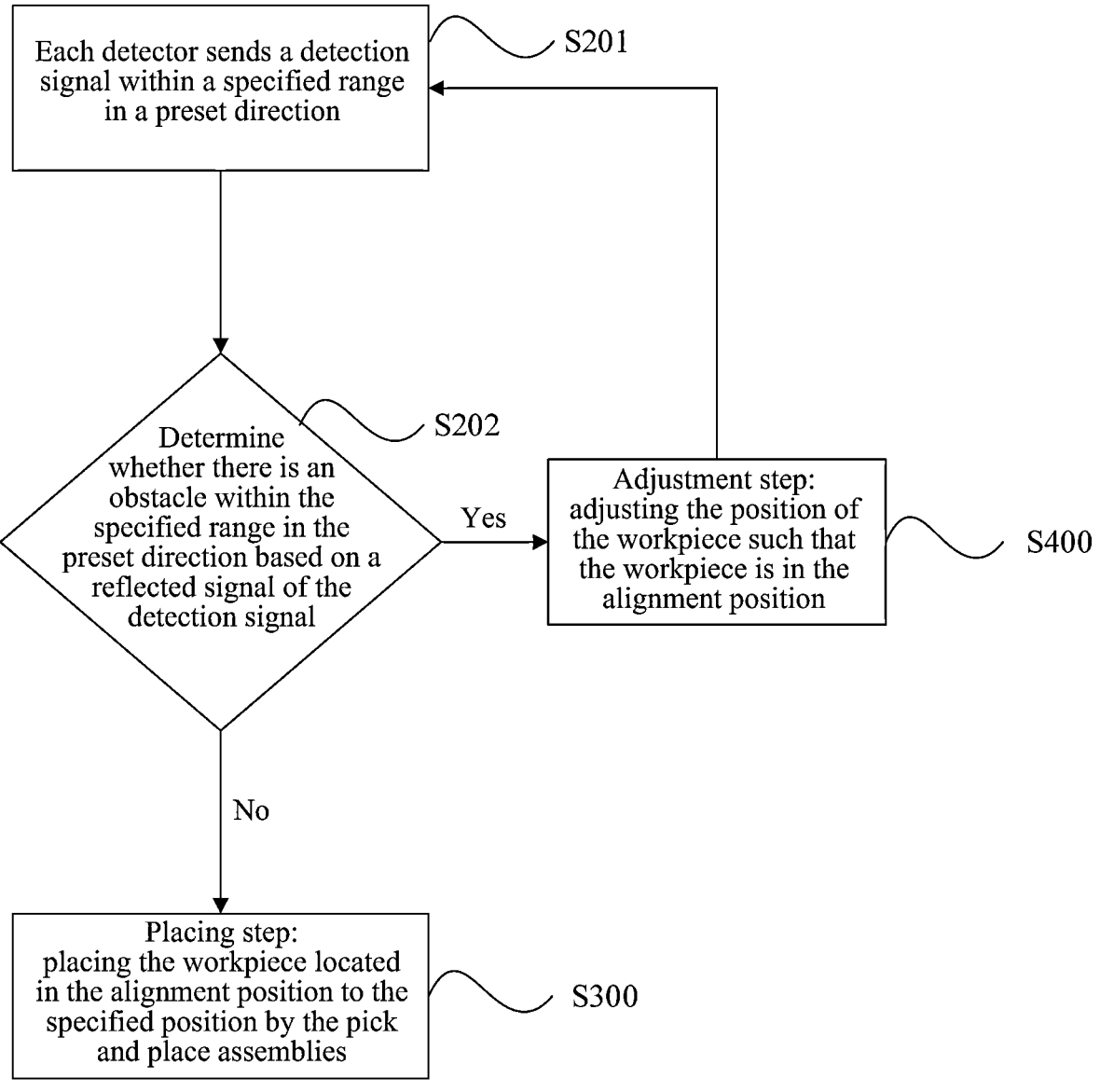
FIG. 7 is another schematic flowchart of a pick and place method according to some embodiments of the present disclosure.

FIG. 1 is a partial schematic perspective structural diagram of a pick and place assembly according to some embodiments of the present disclosure. FIG. 2 is a schematic perspective structural diagram of a pick and place device according to some embodiments of the present disclosure. FIG. 3 is a schematic perspective structural diagram of a pick and place device according to some embodiments of the present disclosure when picking up and placing a workpiece. FIG. 4 is a schematic perspective structural diagram of a connecting member, a connecting plate and detectors according to some embodiments of the present disclosure in an assembled state. FIG. 5 is a schematic perspective exploded structural diagram of a connecting member and a connecting plate according to some embodiments of the present disclosure. FIG. 6 is a schematic flowchart of a pick and place method according to some embodiments of the present disclosure. FIG. 7 is another schematic flowchart of a pick and place method according to some embodiments of the present disclosure.

In some embodiments of the present disclosure, for the convenience of description, a first direction and a second direction are set, and the first direction and the second direction are directions that intersect each other. In the embodiments shown in FIGS. 1 to 7, an example in which the first direction and the second direction are perpendicular to each other is taken for description, but those skilled in the art should understand that the embodiments of the present disclosure are not limited to the situation where the two directions are perpendicular to each other. For the convenience of description, as shown by the arrows in FIGS. 1 to 3, the direction of the arrow X is defined as the first direction X (also called a length direction), and the direction of the arrow Y is defined as the second direction Y (also called a width direction).

As shown in FIGS. 1 to 3, the embodiments of the present disclosure provide a pick and place device 100. The pick and place device 100 is configured to pick up a workpiece 10 and place the workpiece 10 to a specified position. The pick and place device 100 comprises at least one pair of pick and place assemblies 20 and at least two detectors 30. The pick and place assembly 20 comprises a first guide rail 1, a second guide rail 2, a clamping assembly 3 and a connecting member 4. The first guide rail 1 extends in the first direction, and the second guide rail 2 extends in the second direction intersecting the first direction. The clamping assembly 3 comprises a first clamping member 31 and a second clamping member 32. The first clamping member 31 is arranged on the first guide rail 1, the second clamping member 32 is arranged on the second guide rail 2, and the first clamping member 31 and the second clamping member 32 can move closer to or away from each other. The connecting member is connected to the first guide rail 1 and the second guide rail 2, and is configured to be movable along the first guide rail 1 and the second guide rail 2 respectively. Each detector 30 is arranged on the connecting member 4, and is configured to detect whether there is an obstacle within a specified range in a preset direction.

In the production and manufacturing process of products such as batteries, especially during the process of placing a battery into a case, it is generally needed to use a pick and place device to pick up the battery first, and then move the battery to a specified alignment position before placing the battery into the case. It is needed to detect the position of the battery before the battery is placed into the case, so as to prevent the battery from colliding with a case wall or a cross beam inside the case in the process of placing the battery into the case, which otherwise causes damage to the battery or even causes fire and other accidents, or to prevent the occurrence of the undesirable situation where the battery fails to be placed into the case due to that the battery is not in an accurate alignment position. The pick and place device 100 of the embodiments of the present disclosure is a device that is compatible with and capable of picking-up, placing, and detecting batteries of various sizes and specifications.

In the embodiments of the present disclosure, the battery may be a battery cell.

The battery cell refers to a basic unit that can realize the mutual conversion of chemical energy and electrical energy, and can be used to make a battery module or a battery pack to supply power to a power consuming device.

The battery cell may be a secondary battery. The secondary battery refers to a battery cell that can be charged to activate active materials so as to be reused after the battery cell is discharged.

The battery cell may be a lithium-ion battery, a sodium-ion battery, a sodium-lithium-ion battery, a lithium metal battery, a sodium metal battery, a lithium-sulfur battery, a magnesium-ion battery, a nickel-metal hydride battery, a nickel-cadmium battery, a lead-acid battery, etc., which will not be limited in the embodiments of the present disclosure.

Although not shown, the battery cell generally comprises an electrode assembly. The electrode assembly comprises a positive electrode, a negative electrode and a separator. During charging and discharging of the battery cell, active ions (e.g., lithium ions) are intercalated and deintercalated between the positive electrode and the negative electrode. The separator is arranged between the positive electrode and the negative electrode, and mainly functions to prevent a short circuit between the positive electrode and the negative electrode while enabling the active ions to pass through.

In some embodiments, the battery cell further comprises an electrolyte, which functions to conduct ions between the positive and negative electrodes. The type of the electrolyte is not specifically limited in the present disclosure, and can be selected according to actual requirements. The electrolyte may be in a liquid state, a gel state or a solid state.

In some embodiments, the battery cell may comprise a shell. The shell is configured to package the electrode assembly, the electrolyte and other components. The shell may be a steel shell, an aluminum shell, a plastic shell (such as a polypropylene shell), a composite metal shell (such as a copper-aluminum composite shell), an aluminum-plastic film, etc.

As an example, the battery cell may be a cylindrical battery cell, a prismatic battery cell, a pouch battery cell or a battery cell of other shapes. The prismatic battery cell comprises a cubic battery cell, a blade-shaped battery cell, and a polygonal prismatic battery. The polygonal prismatic battery is, for example, a hexagonal prismatic battery, etc. The present disclosure has no particular limitations.

In some embodiments, the shell comprises an end cap and a housing. The housing is provided with an opening, and the end cap closes the opening to form a sealed space for containing the electrode assembly and substances such as the electrolyte. The housing may be provided with one or more openings. One or more end caps may also be provided.

In some embodiments, at least one electrode terminal is arranged on the shell, and the electrode terminal is electrically connected to a tab. The electrode terminal may be directly connected to the tab, or indirectly connected to the tab via an adapter component. The electrode terminal may be arranged on the end cap or on the housing.

In some embodiments, the shell is provided with a pressure relief mechanism. The pressure relief mechanism is configured to relieve the internal pressure of the battery cell.

In the embodiments of the present disclosure, the battery may also be a single physical module comprising one or more battery cells to provide a higher voltage and capacity.

When there are a plurality of battery cells, the plurality of battery cells are connected in series, parallel or series-parallel via a bus component.

The pick and place device 100 of the embodiments of the present disclosure will be described with reference to the accompanying drawings. As shown in FIGS. 1 to 3, the pick and place device 100 comprises pick and place assemblies 20 and detectors 30.

The pick and place assembly 20 is used to realize the pick and place function of the pick and place device 100. The pick and place device 100 can pick up and place the workpiece 10 by means of the pick and place assembly.

In the embodiments of the present disclosure, the pick and place device 100 comprises a pair of two generally L-shaped pick and place assemblies 20. The two pick and place assemblies 20 respectively clamp two opposite corners of the workpiece 10 to perform a picking-up operation, so that the stability and reliability of the pick and place device 100 when picking up the workpiece 10 can be improved, and the possibility of the workpiece 10 falling when picked up by the pick and place device 100 and causing damage to the workpiece 10 is effectively reduced.

Of course, those skilled in the art should understand that the number of pick and place assemblies 20 is not specifically limited in the embodiments of the present disclosure. The pick and place device 100 may comprise only one pair of pick and place assemblies 20, or may comprise two, three or more pairs of pick and place assemblies 20, which may be specifically set according to the actual size and form of the workpiece 10.

The pick and place assembly 20 comprises a first guide rail 1 and a second guide rail 2. The first guide rail 1 extends in a first direction, and the second guide rail 2 extends in a second direction intersecting the first direction.

The guide rail is generally a groove or ridge made of metal or other suitable materials, and is mainly used for linear reciprocating motion. The guide rail can support, fix, guide a moving part or device and reduces friction during its movement.

In the embodiments of the present disclosure, the first direction and the second direction are perpendicular to each other. Of course, in some other embodiments, the first direction and the second direction are not limited to the situation where the two directions are perpendicular to each other.

The pick and place assembly 20 comprises a clamping assembly 3. The clamping assembly 3 can clamp and pick up the workpiece 10. The clamping assembly 3 comprises a first clamping member 31 and a second clamping member 32. The first clamping member 31 is arranged on the first guide rail 1, the second clamping member 32 is arranged on the second guide rail 2, and the first clamping member 31 and the second clamping member 32 can move closer to or away from each other. In this way, it is possible to clamp and pick up the workpiece 10 by moving the first clamping member 31 and the second clamping member 32 closer to each other, and to place the workpiece 10 by moving the first clamping member 31 and the second clamping member 32 away from each other, so that the workpiece 10 can be picked up and placed by means of a simple structure and simple actions, improving the pick and place efficiency and reducing the production cost.

As an example, the first clamping member 31 and the second clamping member 32 may be directly and fixedly connected to the first guide rail 1 and the second guide rail 2.

As another example, the first clamping member 31 and the second clamping member 32 may be indirectly arranged on the first guide rail 1 and the second guide rail 2 by means of other parts.

In the embodiments of the present disclosure, one clamping assembly 3 only comprises one first clamping member 31 and one second clamping member 32. However, in some other embodiments, there may be a plurality of first clamping members 31 and second clamping members 32, the plurality of first clamping members 31 may be arranged at intervals on the first guide rail 1, and the plurality of second clamping members 32 may be arranged at intervals on the second guide rail 2. The number of first clamping members 31 and the number of second clamping members 32 are not specifically limited in the embodiments of the present disclosure.

The pick and place assembly 20 further comprises a connecting member 4. The first guide rail 1 and the second guide rail 2 can be connected to each other via the connecting member 4, and the connecting member 4 can move along the first guide rail 1 and the second guide rail 2 respectively. In this way, the first guide rail 1 can move in the second direction through the movement of the connecting member 4 along the second guide rail 2, and the second guide rail 2 can likewise move in the first direction through the movement of the connecting member 4 along the first guide rail 1, so that the first clamping member 31 arranged on the first guide rail 1 and the second clamping member 32 arranged on the second guide rail 2 can move along with the movement of the first guide rail 1 and the second guide rail 2 so as to move closer to or away from each other, and thus the workpiece 10 can be picked up or placed in a simple manner.

Since the first clamping member 31 and the second clamping member 32 can move in the first direction and the second direction respectively, workpieces 10 of different sizes and specifications can be adapted by adjusting the respective movement strokes of the first clamping member 31 and the second clamping member 32 in the first direction and the second direction, so as to pick up and place workpieces 10 of different sizes and specifications. In this way, only one pick and place device 100 can realize the picking-up and placement of workpieces 10 of various sizes and specifications in a simple manner, the compatibility is better, flexible production is further facilitated, and there is no need to reserve a large amount of buffer space to store various types of pick and place devices, facilitating the improvement of space utilization and reducing the production cost.

The detector 30 can be used to detect whether there is an obstacle within a specified range in a preset direction, so that the detector 30 can be used to determine whether the workpiece 10 is already in the alignment position, that is, whether the workpiece 10 can be accurately placed in the specified position during the placement. In this way, it is possible to prevent undesirable situations such as damage to or placement failure of the workpiece 10 due to touching an obstacle (e.g., a case wall, or a cross beam) during placement, improving the reliability and the placement accuracy of the pick and place device 100.

In the embodiments of the present disclosure, as shown in FIG. 3, the workpiece 10 is generally cuboid-shaped, and the case 40 is located below the workpiece 10. At this time, the preset direction is directed to the bottom of the workpiece 10, and the specified range refers to the corner of the case 40 below the workpiece 10. In some other embodiments, the specified range in the preset direction may also be any other range in any other direction, such as the side, top, etc. of the workpiece, and may be specifically set according to the actual position where the workpiece 10 needs to be placed.

In the embodiments of the present disclosure, there are at least two detectors 30. The two detectors 30 are respectively arranged on the pair of two pick and place assemblies 20. In this way, by detecting whether if there are obstacles below the two opposite corners of the workpiece 10, it can be determined whether the workpiece 10 can be accurately placed in the specified position.

When there are a plurality of pairs of pick and place assemblies 20, each pair of pick and place assemblies 20 may be provided with detectors 30, or only one pair of pick and place assemblies 20 may be provided with detectors 30.

In the embodiments of the present disclosure, each detector 30 is arranged on the respective connecting member 4. In this way, when the first clamping member 31 and the second clamping member 32 move closer to each other in the first direction and the second direction by means of the connecting member 4 to pick up the workpiece 10, the detector 30 can automatically move to a specified detection position along with the connecting member 4 and perform detection within a specified range. Therefore, when the pick and place device 100 picks up workpieces 10 of different sizes and specifications, the detector 30 can also perform corresponding detections on the workpieces 10 of different sizes and specifications, improving the detection compatibility of the pick and place device 100 and further facilitating flexible production.

Although not shown, the pick and place assembly 20 may further comprise a locking mechanism connected to the connecting member 4. The locking mechanism can limit the movements of the connecting member 4 along the first guide rail 1 and the second guide rail 2. In this way, after the position of the connecting member 4 in the first direction and the second direction is adjusted, that is, after the clamping assembly 3 has clamped and picked up the workpiece 10, the connecting member 4 can be locked by the locking mechanism, so that the connecting member 4 can have fixed positions relative to the first guide rail 1 and the second guide rail 2, thereby preventing the workpiece 10 from accidentally falling caused by the change in the positions of the first clamping member 31 and/or the second clamping member 32 due to the accidental sliding of the connecting member 4 during the movement and placement of the workpiece 10, facilitating the improvement of the stability and reliability of the pick and place device 100.

The locking mechanism includes, but is not limited to, a guide rail lock. The locking mechanism can be any suitable structure as long as it can limit the movements of the connecting member 4 along the first guide rail 1 and the second guide rail 2.

In some embodiments of the present disclosure, as shown in FIGS. 4 and 5, the connecting member 4 comprises a first block 41 and a second block 42 connected to each other. The first block 41 is arranged on the first guide rail 1 in such a way that it can move along the first guide rail 1, and the second block 42 is arranged on the second guide rail 2 in such a way that it can move along the second guide rail 2.

In the embodiments of the present disclosure, as shown in FIG. 5, the first block 41 and the second block 42 are each of a split structure. The connecting member 4 further comprises a connecting block 43. A part of a side wall of the first block 41 is recessed inwardly to form a first sliding groove 411. A part of a side wall of the second block 42 is recessed inwardly to form a second sliding groove 421. The first sliding groove 411 and the second sliding groove 421 are arranged to face each other. The connecting block 43 has a generally H-shaped cross-section and is riveted to the first sliding groove 411 and the second sliding groove 421, so as to connect the first block 41 to the second block 42.

The split structure of the first block 41 and the second block 42 facilitates detachment. When one of the blocks is damaged, it can be easily detached and replaced, so that there is no need to replace the entire connecting member 4, and the production cost can be effectively reduced. In addition, when the pick and place device 100 is in an idle state, the first guide rail 1 and the second guide rail 2 can be separated by detaching the first block 41 and the second block 42, thereby facilitating the storage of the pick and place device 100. The picking and placing device 100 will not occupy too much space, facilitating the improvement of space utilization.

The connection method of the first block 41 and the second block 42 is not limited to riveting, and they may alternatively be connected to each other by any other suitable means such as threaded connection, snap-fit or magnetic attraction.

Of course, those skilled in the art should understand that in some other embodiments, the connecting member 4 may alternatively be of an integral structure, that is, the first block 41 and the second block 42 may be formed into an integrated structure, which can increase the connection stability between the first guide rail 1 and the second guide rail 2.

The connecting member 4 can realize the respective movements of the connecting member 4 in the first direction and the second direction in a simple manner through the movement of the first block 41 along the first guide rail 1 and the movement of the second block 42 along the second guide rail 2, so that it is possible to drive the first clamping member 31 and the second clamping member 32 to move in the first direction and the second direction respectively to pick up or place workpieces 10 of different sizes and specifications, and to drive the detector 30 arranged on the connecting member 4 to move in the first direction and the second direction respectively to detect the workpieces 10 of different sizes and specifications, so that the structure is simple, and the picking-up, placement and detection effects are good.

In some embodiments of the present disclosure, as shown in FIGS. 4 and 5, the first block 41 is provided with a first through hole 412, the first through hole 412 penetrates the first block 41 in the first direction, and the first block 41 is sleeved on the first guide rail 1 by means of the first through hole 412. The second block 42 is provided with a second through hole 422, the second through hole 422 penetrates the second block 42 in the second direction, and the second block 42 is sleeved on the second guide rail 2 by means of the second through hole 422.

In this way, the first block 41 can move along the first guide rail 1 through the cooperation between the first through hole 412 and the first guide rail 1, and the second block 42 can move along the second guide rail 2 through the cooperation between the second through hole 422 and the second guide rail 2, thereby realizing the movements of the connecting member 4 along the first guide rail 1 and the second guide rail 2, so that the structure is simple, and is easy to manufacture, and the production cost can be effectively reduced.

As an example, stopping members 6 may be provided at two ends of each of the first guide rail 1 and the second guide rail 2. The size of the stopping member 6 is slightly larger than the size of the first through hole 412 and the second through hole 422, so that when the connecting member 4 moves along the first guide rail 1 or the second guide rail 2, the stopping member can limit the connecting member 4 to prevent the connecting member 4 from falling off the first guide rail 1 and the second guide rail 2, thereby preventing the first guide rail 1 and the second guide rail 2 from being separated from each other, and improving the stability and reliability of the pick and place device 100.

In some embodiments of the present disclosure, as shown in FIG. 4, a connecting plate 5 is arranged on a bottom side of the connecting member 4, and the detector 30 is connected to the connecting plate 5.

In this way, each detector 30 can be arranged on the bottom side of the respective connecting member 4 by means of the connecting plate 5, so that a detection signal can be sent to a specified range in a preset direction to detect whether there is an obstacle.

Of course, those skilled in the art should understand that when the specified range in the preset direction is not the bottom side of the connecting member 4, the connecting plate 5 may be provided at another position of the connecting member 4, so that the mounting position of the detector 30 can be changed by changing the position or form of the connecting plate 5, and the detector 30 can send a detection signal to the specified range in the preset direction according to actual requirements, improving the detection accuracy and the detection reliability.

As an example, the connecting plate 5 may be arranged on the bottom side of the connecting member 4 at a substantially 45° angle, and the detector 30 sends a detection signal toward the bottom of the workpiece 10, so that the detector 30 connected to the connecting plate 5 can be exactly at the corner of the workpiece 10 during detection. In this way, by detecting whether there are obstacles below the two opposite corners of the workpiece 10, it can be determined whether the workpiece 10 can be accurately placed in the specified position.

As another example, the detector 30 is arranged on the connecting plate 5 in such a way that it can emit a detection signal toward a side of the workpiece 10. In this way, when the workpiece 10 needs to be placed to the specified position through a side opening, the detector can detect, toward the side, whether there is an obstacle within a specified range in a preset direction.

As yet another example, a plurality of detectors 30 may be provided, and the plurality of detectors 30 are connected to the connecting plate 5 at different angles or in different orientations. In this way, detection can be performed in multiple orientations, thereby improving the detection accuracy.

In some embodiments of the present disclosure, the connecting plate 5 comprises a first plate body 51 and a second plate body 52, the first plate body 51 extends in the first direction, and the second plate body 52 extends in the second direction. One pick and place assembly 20 is provided with two detectors 30, one of the detectors 30 is arranged on the first plate body 51, and the other detector 30 is arranged on the second plate body 52.

The first plate body 51 and the second plate body 52 may be formed into an integrated structure, or may be assembled from split structures.

The two detectors 30 provided on one pick and place assembly 20 are respectively located on the two plate bodies of the connecting plate 5, and the two detectors 30 can respectively send detection signals toward two different specified ranges by means of the first plate body 51 and the second plate body 52, so that it is possible to detect whether there are obstacles within the two specified ranges, thereby expanding the detection range of the detection, and further improving the detection accuracy.

In the embodiments of the present disclosure, as shown in FIG. 3, the dashed lines below the detectors 30 in FIG. 3 represent the detection signals sent by the detectors 30. Since the first plate body 51 extends in the first direction and the second plate body 52 extends in the second direction, the two detectors 30 can respectively emit detection signals toward the bottom of the workpiece 10 in the first direction and the second direction. In addition, the detector 30 arranged on the first plate body 51 is generally flush with a large surface of the workpiece 10, and the detector 30 arranged on the second plate body 52 is generally flush with a side surface of the workpiece 10. In this way, when the workpiece 10 is being placed, the obstacles below the large surface and the side surface of the workpiece 10 can be detected at the same time, thereby preventing the large surface and the side surface from being damaged due to contact with the obstacles during the placement, further improving the detection accuracy, thereby improving the placement accuracy of the pick and place device 100.

Of course, those skilled in the art should understand that the number of plate bodies of the connecting plate 5 and the number of detectors 30 provided in one pick and place assembly 20 are not specifically limited in the embodiments of the present disclosure. The number of plate bodies and the number of detectors 30 may be one, two or more (more than two), and a user can make specific settings according to the specific shape of the workpiece 10 and the manufacturing difficulty.

In some embodiments of the present disclosure, although not shown, the pick and place device 100 comprises a first driving device and a second driving device. The first driving device is connected to the first clamping member 31, and the second driving device is connected to the second clamping member 32. The first clamping member 31 drives the connecting member 4 to move along the second guide rail 2 under the driving of the first driving device, and the second clamping member 32 drives the connecting member 4 to move along the first guide rail 1 under the driving of the second driving device, so as to perform a clamping operation and cause the detector 30 arranged on the connecting member 4 to move to a specified position.

As an example, the first driving device and the second driving device include, but are not limited to, electric motors or telescopic pneumatic cylinders. As a specific example, servo motors may be used.

Specifically, the first driving device and the second driving device may be, for example, servo motors. The servo motors are connected to lead screws and can drive the lead screws to rotate. The lead screws are configured to be connected to the first clamping member 31 and the second clamping member 32, such that the first clamping member 31 can be driven to reciprocate along the second guide rail 2 with the rotation of the screw rod driven by the first driving device, and the second clamping member 32 can be driven to reciprocate along the first guide rail 1 with the rotation of the screw rod driven by the second driving device.

In this way, the driving of the clamping assembly 3 by the driving device enables the first clamping member 31 and the second clamping member 32 to move closer to or away from each other in an automated manner, so that picking-up of the workpiece 10 is easily realized, the labor cost is reduced, and the pick and place efficiency is improved. In addition, the connecting member 4 will move along with the movement of the clamping assembly 3, so that the detector 30 arranged on the connecting member 4 can also move to the predetermined detection position in an automated manner along with the movement of the connecting member 4, thereby easily realizing the detection.

In some embodiments of the present disclosure, the first clamping member 31 is arranged on the first guide rail 1 in such a way that it can move along the first guide rail 1.

In this way, the first clamping member 31 can also move in the first direction by means of the first guide rail 1, so that the pick and place device 100 can adjust the position of the first clamping member 31 in the first direction depending on the workpieces 10 of different sizes and specifications, in order to achieve a better picking-up operation, facilitating the improvement of the picking-up stability of the pick and place device 100.

As an example, the user can adjust the position of the first clamping member 31 in the first direction such that the first clamping member 31 is generally in a middle region of the workpiece 10 in the first direction when picking up the workpiece 10. In this way, it is possible to improve the stability during picking and reduce the possibility of the workpiece 10 falling.

The first clamping member 31 may, for example, move along the first guide rail 1 by means of a sliding member. The sliding member may be formed into an integrated structure with the first clamping member 31, or may be assembled with the first clamping member 31 as a split structure. The sliding member includes, but is not limited to, a sliding plate, a sliding block, a sliding rod, or a sliding assembly composed of a plurality of structures.

In some embodiments of the present disclosure, the clamping assembly 3 comprises a first slider 33 and a first fixing plate 34. The first slider 33 is arranged on the first guide rail 1 in such a way that it can move along the first guide rail 1, the first fixing plate 34 is connected to the first slider 33, and the first clamping member 31 is connected to the first fixing plate 34.

In the embodiments of the present disclosure, the first guide rail 1 comprises a ridge-shaped protruding structure, the first slider 33 comprises a groove, and the first clamping member 31 can reciprocate along the first guide rail 1 through the cooperation between the groove of the first slider 33 and the ridge-shaped protruding structure of the first guide rail 1. In this way, the movement of the first clamping member 31 in the first direction can be realized by means of a simple structure, thereby reducing the assembly difficulty and saving the production cost.

In some other embodiments, the first guide rail 1 may alternatively comprise a groove, the first slider 33 comprises a protruding structure, and the first clamping member 31 can reciprocate along the first guide rail 1 through the cooperation between the protruding structure of the first slider 33 and the groove of the first guide rail 1.

As an example, the first slider 33 may reciprocate along the first guide rail 1 under the driving of the driving device, so as to drive the first clamping member 31 to reciprocate along the first guide rail 1. The driving device includes, but is not limited to, an electric motor.

As another example, the first slider 33 may alternatively be manually adjusted by the user to reciprocate along the first guide rail 1, so as to drive the first clamping member 31 to reciprocate along the first guide rail 1.

In the embodiments of the present disclosure, there are two first sliders 33, and the two first sliders 33 are arranged spaced apart from each other in the first direction. In some other embodiments, it is also possible to provide only one or more (more than two) first sliders 33. The number of first sliders 33 is not specifically limited in the embodiments of the present disclosure, and can be specifically set according to the actual size of the first guide rail 1.

Although not shown, the clamping assembly 3 may further comprise a first locking member for limiting the movement of the first slider 33 along the first guide rail 1.

The first locking member can likewise be arranged on the first guide rail 1 in such a way that it moves along the first guide rail 1, and is connected to at least a part of the first slider 33. The first locking member has, for example, a movable state and a locked state. When the first locking member is in the movable state, it can reciprocate along the first guide rail 1. When the first locking member is in the locked state, it can be fixed relative to the first guide rail 1. Since the first locking member is connected to the first slider 33, when the first locking member is in the locked state, the first slider 33 is also fixed relative to the first guide rail 1, thereby limiting the movement of the first slider 33 along the first guide rail 1, so that the first clamping member 31 arranged on the first slider 33 can be maintained at the current position in the first direction.

In this way, after the position of the first clamping member 31 in the first direction is adjusted, the first clamping member 31 can be locked by the first locking member, so that the positions of the first clamping member 31 and the first guide rail 1 are relatively fixed, thereby preventing the occurrence of undesirable situations such as the workpiece 10 falling due to accidental sliding of the first clamping member 31 during the process of picking up the workpiece, facilitating the improvement of the picking-up stability of the pick and place device 100.

The first locking member includes, but is not limited to, a guide rail lock, a standard cam, etc. The first locking member may be any other suitable structure as long as the movement of the first slider 33 along the first guide rail 1 can be limited.

The first fixing plate 34 covers and is connected to the first slider 33, and the first clamping member 31 is connected to the first fixing plate 34. Due to the provision of the first fixing plate 34, the stability of the first clamping member 31 when moving in the first direction and the picking-up stability when picking up the workpiece 10 can be improved. Of course, in some other embodiments, the clamping assembly 3 may not comprise the first fixing plate 34, and the first clamping member 31 may be directly connected to the first slider 33.

In some embodiments of the present disclosure, the second clamping member 32 is arranged on the second guide rail 2 in such a way that it can move along the second guide rail 2.

In this way, the second clamping member 32 can also move in the second direction by means of the second guide rail 2, so that the pick and place device 100 can adjust the position of the second clamping member 32 in the second direction depending on the workpieces 10 of different sizes and specifications, in order to achieve a better picking-up operation, further facilitating the improvement of the picking-up stability of the pick and place device 100.

As an example, the user can adjust the position of the second clamping member 32 in the second direction such that the second clamping member 32 is generally in a middle region of the workpiece 10 in the second direction when picking up the workpiece 10. In this way, it is possible to improve the stability during picking and reduce the possibility of the workpiece 10 falling.

The second clamping member 32 may likewise, for example, move along the second guide rail 2 by means of a sliding member. The sliding member may be formed into an integrated structure with the second clamping member 32, or may be assembled with the second clamping member 32 as a split structure. The sliding member includes, but is not limited to, a sliding plate, a sliding block, a sliding rod, or a sliding assembly composed of a plurality of structures.

In some embodiments of the present disclosure, the clamping assembly 3 comprises a second slider 35 and a second fixing plate 36. The second slider 35 is arranged on the second guide rail 2 in such a way that it can move along the second guide rail 2, the second fixing plate 36 is connected to the second slider 35, and the second clamping member 32 is connected to the second fixing plate 36.

In the embodiments of the present disclosure, the second guide rail 2 comprises a ridge-shaped protruding structure, the second slider 35 comprises a groove, and the second clamping member 32 can reciprocate along the second guide rail 2 through the cooperation between the groove of the second slider 35 and the ridge-shaped protruding structure of the second guide rail 2. In this way, the movement of the second clamping member 32 in the second direction can be realized by means of a simple structure, thereby reducing the assembly difficulty and saving the production cost.

In some other embodiments, the second guide rail 2 may alternatively comprise a groove, the second slider 35 comprises a protruding structure, and the second clamping member 32 can reciprocate along the second guide rail 2 through the cooperation between the protruding structure of the second slider 35 and the groove of the second guide rail 2.

As an example, the second slider 35 may reciprocate along the second guide rail 2 under the driving of the driving device, so as to drive the second clamping member 32 to reciprocate along the second guide rail 2. The driving device includes, but is not limited to, an electric motor.

As another example, the second slider 35 may alternatively be manually adjusted by the user to reciprocate along the second guide rail 2, so as to drive the second clamping member 32 to reciprocate along the second guide rail 2.

In the embodiments of the present disclosure, there may be one second slider 35. In some other embodiments, it is also possible to provide two, three or more second sliders 35. The number of second sliders 35 is not specifically limited in the embodiments of the present disclosure, and can be specifically set according to the actual size of the second guide rail 2.

Although not shown, the clamping assembly 3 may further comprise a second locking member for limiting the movement of the second slider 35 along the second guide rail 2.

The second locking member can likewise be arranged on the second guide rail 2 in such a way that it moves along the second guide rail 2, and is connected to at least a part of the second slider 35. The second locking member likewise has, for example, a movable state and a locked state. When the second locking member is in the movable state, it can reciprocate along the second guide rail 2. When the second locking member is in the locked state, it can be fixed relative to the second guide rail 2. Since the second locking member is connected to the second slider 35, when the second locking member is in the locked state, the second slider 35 is also fixed relative to the second guide rail 2, thereby limiting the movement of the second slider 35 along the second guide rail 2, so that the second clamping member 32 arranged on the second slider 35 can be maintained at a current position in the second direction.

In this way, after the position of the second clamping member 32 in the second direction is adjusted, the second clamping member 32 can be locked by the second locking member, so that the positions of the second clamping member 32 and the second guide rail 2 are relatively fixed, thereby preventing the occurrence of undesirable situations such as the workpiece 10 falling due to accidental sliding of the second clamping member 32 during the process of picking up the workpiece 10, facilitating the improvement of the picking-up stability of the pick and place device 100.

The second locking member includes, but is not limited to, a guide rail lock, a standard cam, etc. The second locking member may be any other suitable structure as long as the movement of the second slider 35 along the second guide rail 2 can be limited.

The second fixing plate 36 covers and is connected to the second slider 35, and the second clamping member 32 is connected to the second fixing plate 36. Due to the provision of the second fixing plate 36, the stability of the second clamping member 32 when moving in the second direction and the picking-up stability when picking up the workpiece 10 can be improved. Of course, in some other embodiments, the clamping assembly 3 may not comprise the second fixing plate 36, and the second clamping member 32 may be directly connected to the second slider 35.

In some embodiments of the present disclosure, the first clamping member 31 and the second clamping member 32 comprise pressure strips 7. The pressure strips 7 are respectively arranged on clamping surfaces of the first clamping member 31 and the second clamping member 32, and in a state where the pick and place device picks up the workpiece, the clamping surfaces face the workpiece. The pressure strips 7 each comprise a contact surface configured for contact with workpiece 10.

Since the clamping assembly 3 comprises pressure strips 7, and the pressure strips 7 comprise contact surfaces, the workpiece 10 can be clamped and picked up through the contact between the contact surfaces of the pressure strips 7 and the workpiece 10, so that the structure is simple and the picking-up effect is good.

In the embodiments of the present disclosure, when the pick and place device 100 picks up the workpiece 10, the detector 30 is generally parallel to the contact surface of the pressure strip 7. This helps the detector 30 detect whether the surface of the workpiece 10 will touch an obstacle during the placement.

In some embodiments of the present disclosure, the pressure strip 7 is made of an elastic material.

In this way, when the pick and place device 100 clamps and picks up the workpiece 10, the elastic pressure strips 7 can avoid damage to the surface of the workpiece 10, thereby improving the picking reliability of the pick and place device 100.

The elastic material includes, but is not limited to, rubber.

In some embodiments of the present disclosure, the detector 30 comprises a range finder.

The range finder is an instrument that can measure the length or distance. The range finder may, for example, emit a beam of light to a specified position and measure the time it takes for the light to be reflected back from the specified position, so as to calculate the distance between the instrument and the specified position.

When there is an obstacle in the specified position, the time it takes for the light to be reflected back will be different. In this way, the distance measured by the range finder will be different from a preset distance. In this way, the range finder can be used to measure the distance within the specified range in the preset direction, and then based on the comparison between the measured distance and a preset distance, it is possible to detect whether there is an obstacle within the specified range in the preset direction, so as to prevent the occurrence of undesirable situations such as damage to the workpiece 10 due to touching an obstacle during placement, improving the reliability of the pick and place device 100.

Here, the preset distance is a distance between the range finder and the specified position when there is no obstacle within the specified range in the preset direction.

In some embodiments of the present disclosure, the intersecting comprises perpendicular intersecting.

In this way, the workpiece 10 can be picked up and placed along two perpendicular directions in a plane. This is particularly suitable for picking up and placing cuboid-shaped workpieces 10.

Of course, in some other embodiments, the first direction and the second direction are not limited to the situation where the two directions are perpendicular to each other.

The embodiments of the present disclosure provide a pick and place method, in which a pick and place device 100 is used to pick up a workpiece 10 and place the workpiece 10 to a specified position. The pick and place device 100 comprises at least one pair of pick and place assemblies 20 and at least two detectors 30. The detectors 30 are each configured to detect whether there is an obstacle within a specified range in a preset direction. As shown in FIG. 6, the pick and place method comprises:

step S100, a picking-up step: picking up the workpiece by means of the pick and place assemblies of the pick and place device, and moving the workpiece to the vicinity of a specified position;

step S200, a detection step: sending a detection signal within the specified range in the preset direction by each detector to confirm that the workpiece moves to an alignment position for the specified position; and step S300, a placing step: placing the workpiece located in the alignment position to the specified position by the pick and place assemblies.

In the embodiments of the present disclosure, the specified position is below the pick and place device 100. Therefore, the preset direction is directed to the bottom of the pick and place device 100, that is, the pick and place device 100 sends a detection signal toward a specified range below it. Of course, in some other embodiments, the specified position and the preset direction may alternatively refer to the top, side, etc. of the pick and place device 100, which are not specifically limited in the embodiments of the present disclosure, and can be set based on the actual position where the workpiece 10 needs to be placed.

In addition, in the embodiments of the present disclosure, since the workpiece 10 is generally cuboid-shaped and is finally placed in a specified position of the cuboid, it is only needed to ensure that at least two corners of the workpiece 10 do not touch obstacles (a side wall in the specified position, etc.) during the placement, the workpiece 10 can generally be accurately placed in the specified position. Therefore, the specified range may be at least two corners of the specified position of the cuboid below the pick and place device 100.

In this way, in the pick and place method of the embodiments of the present disclosure, the workpiece 10 can be easily picked up and placed by using the pick and place device 100, and before placing the workpiece 10, it is detected whether there is an obstacle within a specified range in a specified region to ensure that the workpiece 10 can be moved to an accurate alignment position, so as to prevent the damage to or placement failure of the workpiece 10 due to contact of the workpiece 10 with an obstacle during placement, improving the placement accuracy.

In some embodiments of the present disclosure, before the detection step, the pick and place method further comprises: a correction step of correcting the position of the workpiece by an image capture device.

In this way, when the workpiece 10 moves to the vicinity of the specified position, the position of the workpiece 10 can be substantially corrected by the image capture device first, and the positional relationship between the workpiece 10 and the specified position can be detected to ensure that the workpiece 10 can be within the specified range in the preset direction, to prevent the occurrence of the undesirable situation where the workpiece 10 has failed to be placed in the specified position at all during placement, for example, the workpiece is completely placed outside the specified position.

The image capture device includes, but is not limited to, a charge coupled device (CCD) camera and a complementary metal oxide semiconductor (CMOS) camera.

In some embodiments of the present disclosure, the pick and place assembly 20 comprises a first guide rail 1, a second guide rail 2, a clamping assembly 3 and a connecting member 4. The pick and place device 100 further comprises a first driving device and a second driving device. The clamping assembly 3 comprises a first clamping member 31 and a second clamping member 32. The first clamping member 31 is arranged on the first guide rail 1, and the second clamping member 32 is arranged on the second guide rail 2. The first clamping member 31 is connected to the first driving device, the second clamping member 32 is connected to the second driving device, the first clamping member 31 and the second clamping member 32 can move closer to or away from each other, clamping surfaces of the first clamping member 31 and the second clamping member 32 are respectively provided with pressure strips 7, the pressure strips 7 comprise contact surfaces, and in a state where the pick and place device picks up the workpiece, the clamping surfaces face the workpiece. The connecting member 4 is connected to the first guide rail 1 and the second guide rail 2. The picking-up step comprises: the first clamping member 31 driving the connecting member 4 to move along the second guide rail 2 under the driving of the first driving device until the contact surface of the pressure strip 7 of the first clamping member 31 comes into contact with a surface of the workpiece 10; and the second clamping member 32 driving the connecting member 4 to move along the first guide rail 1 under the driving of the second driving device until the contact surface of the pressure strip 7 of the second clamping member 32 comes into contact with a surface of the workpiece 10.

In this way, the first clamping member 31 and the second clamping member 32 can clamp and pick up the workpiece 10 in a simple and automated manner under the driving of the driving devices, thereby reducing the labor cost and improving the picking-up efficiency of the pick and place device 100. In addition, the movement strokes of the first clamping member 31 and the second clamping member 32 along the first guide rail 1 and the second guide rail 2 can be changed to adapt to workpieces 10 of different sizes and specifications, providing good compatibility and further facilitating flexible production.

In some embodiments of the present disclosure, as shown in FIG. 7, before the placing step, the pick and place method further comprises:

step S400, an adjustment step: adjusting the position of the workpiece such that the workpiece is in the alignment position.

In this way, the position of the workpiece 10 can be adjusted before placing the workpiece 10, so that the workpiece 10 can be accurately located in the alignment position, to prevent the occurrence of the undesirable situation where the workpiece 10 is not placed in the specified position during placement, improving the placement accuracy and reliability of the workpiece.

In step S400, the position of the workpiece 10 may be adjusted manually, for example, or may be adjusted automatically through automation.

In some embodiments of the present disclosure, as shown in FIG. 7, the detection step comprises:

S201: each detector sending a detection signal within a specified range in a preset direction; and S202: determining whether there is an obstacle within the specified range in the preset direction based on a reflected signal of the detection signal.

It is determined whether the detection signals sent by all the detectors reach the specified position, and if the detection signals all reach the specified position, it is determined that there is no obstacle within the specified range in the preset direction, to confirm that the workpiece moves to the alignment position for the specified position, and the method proceeds to the placing step; otherwise, it is determined that there is an obstacle within the specified range in the preset direction, the workpiece does not move to the alignment position for the specified position, an alarm is sent the method proceeds to the adjustment step, and the detection step is repeated after the adjustment is completed, until the workpiece 10 is located in the alignment position for the specified position.

In steps 201 and 202, the detector 30 may be, for example, a range finder. The range finder may emit light (a detection signal) to a specified range in a preset direction. The light will be reflected after contacting an object. The range finder can record the round trip time of the light to calculate the distance between the range finder and the object being measured. If there is an obstacle within the specified range in the preset direction, the light emitted by the range finder will first come into contact with the obstacle and be reflected earlier. In this way, the round trip time of the light is shorter than a preset time (i.e., the round-trip time of the light when there is no obstacle within the specified range in the preset direction), so that the range finder can infer that there is an obstacle within the specified range in the preset direction.

Of course, those skilled in the art should understand that the detector 30 may be any other suitable detector 30 as long as it can detect whether there is an obstacle within the specified range in the preset direction.

Since the detection result of the detector 30 can be used to determine whether there is an obstacle within the specified range in the preset direction, it can be easily determined whether the workpiece 10 can be accurately placed in the specified position, to prevent the occurrence of undesirable situations such as damage to the workpiece 10 due to contact with an obstacle during placement. In addition, since an alarm will be sent in the detection step when it is determined that the workpiece 10 has failed to move to the alignment position, and the method proceeds to the adjustment step to adjust the position of the workpiece 10, the position of the workpiece 10 that has not moved to the alignment position can be adjusted again. After the adjustment is completed, the detection step is repeated until the workpiece 10 is located in the alignment position. This ensures that the workpiece 10 can finally be accurately placed in the specified position, facilitating the improvement of the placement accuracy and reliability of the workpiece 10.

Of course, those skilled in the art should understand that if the workpiece 10 is detected to be in the alignment position when the detection step is performed only once, that is, there is no obstacle within the specified range in the preset direction, the method will not proceed to the adjustment step. That is, after the one detection step, the placing step can be directly performed to accurately place the workpiece 10 in the specified position.

In some embodiments of the present disclosure, the workpiece 10 comprises at least one battery. The specified position comprises a case for accommodating the at least one battery.

In this way, the pick and place method using a pick and place device 100 can be used to pick up and place the battery, and can be used to detect whether the battery will touch an obstacle (e.g., a case wall, or a cross beam in the case) when it is placed into the case, that is, whether the battery can be accurately placed into the case. Moreover, it is also possible to be compatible with batteries of different sizes and specifications, thereby improving the compatibility of the pick and place method and the production method of the entire production line.

The battery production line of the embodiments of the present disclosure will be described below with reference to FIG. 3. FIG. 3 is a schematic perspective structural diagram of a pick and place device 100 and a case 40 in a battery production line according to some embodiments of the present disclosure.

The present disclosure also provides a battery production line. The battery production line comprises a pick and place device 100 according to any one of the above embodiments, a case 40 and a transfer device. The case 40 has an accommodating space for accommodating the workpiece 10, and the pick and place device 100 picks up and places a battery as the workpiece 10 and places the battery into the accommodating space of the case. The transfer device is connected to the pick and place device 100, and is configured to lift and transfer the pick and place device 100.

The case 40 in the embodiments of the present disclosure has an accommodating space for accommodating at least one battery. In some other embodiments, the accommodating space of the case 40 may be used to accommodate a plurality of battery modules, bus components, and other components of the battery.

In some embodiments, a structure such as a cross beam for fixing the workpiece such as the battery may be further provided in the case 40. The shape of the case 40 may be determined according to the shape of the battery or battery module to be accommodated. In some embodiments, the case 40 may be in the shape of a cube having an opening.

The transfer device (not shown) is a device for lifting, lowering and transferring the pick and place device 100. After the pick and place device 100 picks up the battery, the transfer device can lift the pick and place device 100 and transfer the pick and place device 100 together with the picked-up battery to the vicinity of the case 40, and lower the pick and place device 100 after confirming that the battery is in a specified alignment position, to facilitate the pick and place device 100 to place the battery into the case 40.

Of course, after the pick and place device 100 has placed the battery, the transfer device can lift the pick and place device 100 again, and transfer and lower the pick and place device 100 to an initial position, so that the pick and place device 100 can continue to perform corresponding pick and place operations on the next set of batteries.

As an example, the transfer device is provided with a driving device, and the transfer device can realize operations such as transferring, lifting and lowering the pick and place device 100 by means of the driving device. The driving device includes, but is not limited to, a servo motor, a telescopic pneumatic cylinder, etc.

In the embodiments of the present disclosure, the transfer device is a gantry crane. In some other embodiments, the transfer device may be any other suitable device, as long as it can realize the lifting, lowering and transferring of the pick and place device 100.

In this way, the battery as the workpiece 10 can be picked up, detected and placed by means of a simple structure and simple actions, facilitating accurate and safe placement of the battery in the case 40, and providing better stability and higher reliability. Moreover, the pick and place device 100 can adapt to batteries of various sizes and specifications, and have better compatibility. Moreover, flexible production of the battery production line is also facilitated.

In some embodiments of the present disclosure, the battery production line further comprises an image capture device configured to detect the positional relationship between the picked-up battery and the case 40.

The image capture device may be an existing or commercially available image capture device, which is not specifically limited in the embodiments of the present disclosure.

As an example, the image capture device includes, but is not limited to, a CCD camera and a CMOS camera. The two cameras each have a small size, light weight, good sensitivity and good reliability.

In this way, before the pick and place device 100 places the battery into the case 40, the image capture device can be used to preliminarily detect the positional relationship between the battery and the case 40, so as to ensure that the battery can be located within the range of the opening of the case 40, and to prevent the occurrence of the undesirable situation where the battery has failed to be placed into the case 40 during placement, thereby improving the reliability and placement accuracy of the pick and place device 100.

Specific examples of some embodiments of the present disclosure are described below with reference to the accompanying drawings.

As a specific example, for example, a battery is picked up and placed into a case. The pick and place device 100 comprises a pair of pick and place assemblies 20. Each pick and place assembly 20 comprises a long-side slide rail (first guide rail 1), a short-side slide rail (second guide rail 2), a connecting block (connecting member 4), and a side clamping plate (first clamping member 31), an end clamping plate (second clamping member 32) and a range finder (detector 30). The range finder is connected to the connecting block, and the connecting block is connected to the long-side slide rail and the short-side slide rail. The side clamping plate is connected to the long-side slide rail via a long-side slider (first slider 33) and a connecting plate (first fixing plate 34), and the end clamping plate is connected to the short-side slide rail via a short-side slider (second slider 35) and a connecting plate (second fixing plate 36). During the process of picking up the battery, the side clamping plate and the end clamping plate can drive the connecting block to slide, so as to realize the automatic movement of the range finder to its working position.

Specifically, when the pick and place device 100 picks up the battery, the pair of pick and place assemblies 20 are respectively located at two opposite corners of the battery, and the side clamping plates of the pair of pick and place assemblies 20 are driven by a servo motor (driving device) to move along the short-side slide rail until two long sides of the battery are clamped. During this process, the range finder also slides into place along the short-side slide rail and is substantially flush with a large surface of the battery. The end clamping plates of the pair of pick and place assemblies 20 are driven by a servo motor to move along the long-side slide rail until two short sides of the battery are clamped. During this process, the range finder also slides into place along the long-side slide rail and is substantially flush with a side surface of the battery.

In this way, through the cooperation of the side clamping plates and the end clamping plates, the battery can be clamped by means of a simple structure and in a simple way, and the range finder can automatically slide into place by means of the connecting block, and can adapt to batteries of different sizes and specifications, effectively improving the compatibility and flexibility of the pick and place device 100.

After picking up the battery, the pick and place device 100 moves the clamped battery to the top of the case, performs image capture and correction by means of the image capture device, and then waits for placement. At this time, the range finder is activated and emits light. If the light can directly illuminate the bottom of the case (there is no obstacle within the specified range in the preset direction), it means that the battery is in a correct position before being placed into the case, and can be placed into the case. If the light of one of the range finders illuminates a case wall or cross beam of the case (there is an obstacle within the specified range in the preset direction), it means that the battery is not in the correct position before being placed into the case, and cannot be placed into the case. The range finder will automatically feedback and send an alarm to remind the user to adjust the position of the battery.

The pick and place device 100 of the specific embodiment of the present disclosure can realize automatic picking-up, automatic detection and automatic placement, improves the degree of automation, effectively reduces the labor cost, is compatible with the picking-up, placement and detection of batteries of different sizes and specifications, has better compatibility, and further facilitates flexible production.

The foregoing embodiments are merely used for illustrating rather than limiting the technical solutions of the present disclosure. Although the present disclosure has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present disclosure, fall within the scope of the present disclosure. In particular, the technical features mentioned in the embodiments can be combined in any manner, provided that there is no structural conflict.

INDUSTRIAL APPLICABILITY

In the embodiments of the present disclosure, since the pick and place device comprises at least one pair of pick and place assemblies, and each pick and place assembly comprises a first clamping member and a second clamping member that can move closer to or away from each other, it is possible to pick up the workpiece by moving the first clamping member and the second clamping member closer to each other, and to place the workpiece by moving the first clamping member and the second clamping member away from each other, so that the workpiece can be picked up and placed by means of a simple structure and simple actions, improving the pick and place efficiency and reducing the production cost. Moreover, since the pick and place device further comprises detectors, after picking up the workpiece, each detector can be used to detect whether there is an obstacle within a specified range in a preset direction, so as to prevent the occurrence of undesirable situations such as damage to or placement failure of the workpiece due to touching an obstacle during placement, improving the reliability of the pick and place device. In addition, since the pick and place assembly comprises a connecting member connected to the first guide rail and the second guide rail, and the connecting member can move along the first guide rail and the second guide rail respectively, the first guide rail can move in the second direction by means of the connecting member, and the second guide rail can also move in the first direction by means of the connecting member. In this way, the first clamping member arranged on the first guide rail and the second clamping member arranged on the second guide rail can be moved closer to or away from each other in a simple manner, thereby realizing the picking-up or placement of the workpiece, and workpieces of different sizes and specifications can also be adapted by adjusting the movement strokes of the first clamping member and the second clamping member in the first direction and the second direction, so as to pick up and place workpieces of different sizes and specifications, thereby providing good compatibility and facilitating flexible production. Moreover, since each detector is arranged on the connecting member, when the first clamping member and the second clamping member move closer to each other in the first direction and the second direction by means of the connecting member to pick up the workpiece, the detector can move along with the connecting member to the specified position for detection. Since the detector can move along with the movement of the connecting member, when the pick and place device picks up workpieces of different sizes and specifications, the detector can also perform corresponding detections on the workpieces of different sizes and specifications, improving the detection compatibility of the pick and place device and further facilitating flexible production.

What is claimed is:

1. A pick and place device for picking up and placing a workpiece, the pick and place device comprising at least one pair of pick and place assemblies and at least two detectors, wherein:

each of the pick and place assemblies comprises:
a first guide rail extending in a first direction;
a second guide rail extending in a second direction intersecting the first direction;
a clamping assembly, comprising a first clamping member and a second clamping member, wherein the first clamping member is arranged on the first guide rail, the second clamping member is arranged on the second guide rail, and the first clamping member and the second clamping member are movable closer to or away from each other; and
a connecting member connected to the first guide rail and the second guide rail, and configured to be movable along the first guide rail and the second guide rail;

each detector is arranged on the respective connecting member and is configured to detect whether there is an obstacle within a specified range in a preset direction;

the connecting member comprises a first block and a second block connected to each other;

the first block is arranged on the first guide rail in such a way that it is movable along the first guide rail, and the second block is arranged on the second guide rail in such a way that it is movable along the second guide rail;

the first block is provided with a first through hole penetrating the first block in the first direction, and the first block is sleeved on the first guide rail by means of the first through hole; and the second block is provided with a second through hole penetrating the second block in the second direction, and the second block is sleeved on the second guide rail by means of the second through hole.

2. The pick and place device according to claim 1, wherein:

the connecting member is provided with a connecting plate, and the detector is connected to the connecting plate.

3. The pick and place device according to claim 2, wherein:

the connecting plate comprises a first plate body and a second plate body, the first plate body extends in the first direction, and the second plate body extends in the second direction; and one pick and place assembly is provided with two detectors, one of the detectors is arranged on the first plate body, and the other detector is arranged on the second plate body.

4. The pick and place device according to claim 1, wherein:

the pick and place device comprises a first driving device and a second driving device, the first driving device is connected to the first clamping member, and the second driving device is connected to the second clamping member; and the first clamping member drives the connecting member to move along the second guide rail under the driving of the first driving device, and the second clamping member drives the connecting member to move along the first guide rail under the driving of the second driving device, so as to perform a clamping operation and cause the detector arranged on the connecting member to move to a specified position.

5. The pick and place device according to claim 1, wherein:

the first clamping member is arranged on the first guide rail in such a way that it is movable along the first guide rail.

6. The pick and place device according to claim 5, wherein:

the clamping assembly comprises a first slider and a first fixing plate; and the first slider is arranged on the first guide rail in such a way that it is movable along the first guide rail, the first fixing plate is connected to the first slider, and the first clamping member is connected to the first fixing plate.

7. The pick and place device according to claim 1, wherein:

the second clamping member is arranged on the second guide rail in such a way that it is movable along the second guide rail.

8. The pick and place device according to claim 7, wherein:

the clamping assembly comprises a second slider and a second fixing plate; and the second slider is arranged on the second guide rail in such a way that it is movable along the second guide rail, the second fixing plate is connected to the second slider, and the second clamping member is connected to the second fixing plate.

9. The pick and place device according to claim 1, wherein:

the first clamping member and the second clamping member comprise pressure strips, which are respectively arranged on clamping surfaces of the first clamping member and the second clamping member, and in a state where the pick and place device picks up the workpiece, the clamping surfaces face the workpiece; and the pressure strips each comprise a contact surface configured for contact with the workpiece.

10. The pick and place device according to claim 9, wherein:

the pressure strip is made of an elastic material.

11. The pick and place device according to claim 1, wherein:

the detector comprises a range finder.

12. The pick and place device according to claim 1, wherein:

the intersecting comprises perpendicular intersecting.

13. A pick and place method for the pick and place device according to claim 1, comprising:

a picking-up step of picking up the workpiece by means of the pick and place assemblies of the pick and place device, and moving the workpiece to the vicinity of a specified position;

a detection step of sending a detection signal within the specified range in the preset direction by each detector to confirm that the workpiece moves to an alignment position for the specified position; and a placing step of placing the workpiece located in the alignment position to the specified position by the pick and place assemblies.

14. The pick and place method according to claim 13, further comprising, before the detection step:

a correction step of correcting the position of the workpiece by an image capture device.

15. The pick and place method according to claim 13, wherein the picking-up step comprises:

the first clamping member driving the connecting member to move along the second guide rail under the driving of the first driving device until the contact surface of the pressure strip of the first clamping member comes into contact with a surface of the workpiece; and the second clamping member driving the connecting member to move along the first guide rail under the driving of the second driving device until the contact surface of the pressure strip of the second clamping member comes into contact with a surface of the workpiece.

16. The pick and place method according to claim 13, further comprising, before the placing step:

an adjustment step of adjusting the position of the workpiece such that the workpiece is in the alignment position.

17. The pick and place method according to claim 16, wherein the detection step comprises:

each detector sending a detection signal within a specified range in a preset direction; and determining whether there is an obstacle within the specified range in the preset direction based on a reflected signal of the detection signal, wherein it is determined whether the detection signals sent by all the detectors reach the specified position, and if the detection signals all reach the specified position, it is determined that there is no obstacle within the specified range in the preset direction, to confirm that the workpiece moves to the alignment position for the specified position, and the method proceeds to the placing step; otherwise, it is determined that there is an obstacle within the specified range in the preset direction, the workpiece does not move to the alignment position for the specified position, an alarm is sent the method proceeds to the adjustment step, and the detection step is repeated after the adjustment is completed, until the workpiece is located in the alignment position for the specified position.

18. The pick and place method according to claim 13, wherein:

the workpiece comprises at least one battery; and the specified position comprises a case for accommodating the at least one battery.

19. A pick and place device for picking up and placing a workpiece, the pick and place device comprising at least one pair of pick and place assemblies and at least two detectors, wherein:

each of the pick and place assemblies comprises:

a first guide rail extending in a first direction;

a second guide rail extending in a second direction intersecting the first direction;

a clamping assembly, comprising a first clamping member and a second clamping member, wherein the first clamping member is arranged on the first guide rail, the second clamping member is arranged on the second guide rail, and the first clamping member and the second clamping member are movable closer to or away from each other; and a connecting member connected to the first guide rail and the second guide rail, and configured to be movable along the first guide rail and the second guide rail;

each detector is arranged on the respective connecting member and is configured to detect whether there is an obstacle within a specified range in a preset direction;

the connecting member is provided with a connecting plate, and the detector is connected to the connecting plate;

the connecting plate comprises a first plate body and a second plate body, the first plate body extends in the first direction, and the second plate body extends in the second direction; and one pick and place assembly is provided with two detectors, one of the detectors is arranged on the first plate body, and the other detector is arranged on the second plate body.

20. A pick and place device for picking up and placing a workpiece, the pick and place device comprising at least one pair of pick and place assemblies and at least two detectors, wherein:

each of the pick and place assemblies comprises:

a first guide rail extending in a first direction;

a second guide rail extending in a second direction intersecting the first direction;

a clamping assembly, comprising a first clamping member and a second clamping member, wherein the first clamping member is arranged on the first guide rail, the second clamping member is arranged on the second guide rail, and the first clamping member and the second clamping member are movable closer to or away from each other; and a connecting member connected to the first guide rail and the second guide rail, and configured to be movable along the first guide rail and the second guide rail;

each detector is arranged on the respective connecting member and is configured to detect whether there is an obstacle within a specified range in a preset direction;

the first clamping member and the second clamping member comprise pressure strips, which are respectively arranged on clamping surfaces of the first clamping member and the second clamping member, and in a state where the pick and place device picks up the workpiece, the clamping surfaces face the workpiece; and the pressure strips each comprise a contact surface configured for contact with the workpiece.

* * * * *